(12) United States Patent
Nomura et al.

(10) Patent No.: US 7,528,970 B2
(45) Date of Patent: May 5, 2009

(54) DATA MANAGEMENT SYSTEM AND METHOD

(75) Inventors: Takahiko Nomura, Tokyo (JP); Yasuo Horino, Tokyo (JP); Jun Kiyota, Tokyo (JP); Yoichiro Maeda, Tokyo (JP); Hitoshi Ihashi, Tokyo (JP); Kenichi Suzuki, Kanagawa (JP); Naoya Takezaki, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 603 days.

(21) Appl. No.: 10/941,105

(22) Filed: Sep. 15, 2004

(65) Prior Publication Data

US 2005/0134927 A1    Jun. 23, 2005

(30) Foreign Application Priority Data

Dec. 9, 2003    (JP)    ............................ P2003-410423

(51) Int. Cl.
*G06F 15/00* (2006.01)
*G06K 1/00* (2006.01)
*G06K 15/00* (2006.01)
*G06F 3/12* (2006.01)

(52) U.S. Cl. ..................................... 358/1.12; 358/1.15

(58) Field of Classification Search ................. 358/1.12, 358/403, 1.15; 382/306; 400/103; 370/475; 709/203

See application file for complete search history.

(56) References Cited

U.S. PATENT DOCUMENTS

| 5,222,157 | A | * | 6/1993 | Yoneda et al. | ............... 382/306 |
| 5,489,158 | A | * | 2/1996 | Wang et al. | ................. 400/103 |
| 5,625,467 | A | * | 4/1997 | Kurokawa | ................... 358/470 |
| 6,735,220 | B1 | * | 5/2004 | Shirriff | ........................ 370/475 |

FOREIGN PATENT DOCUMENTS

JP    2001-105786 A    4/2001

OTHER PUBLICATIONS

Anoto Functionality; http://www.anotofunctionality.com/navigate.asp?PageID=73; Jul. 5, 2004.

* cited by examiner

*Primary Examiner*—Douglas Q Tran
(74) *Attorney, Agent, or Firm*—Sughrue Mion, PLLC

(57) ABSTRACT

When an user inserts already used paper into a shredder of PC, a scanner disposed with the shredder reads a background pattern put on the paper. The shredder shreds and discards the inserted paper. The PC transmits the background pattern put on the discard paper to a background management unit and further notifies a background management unit that the paper is discarded. The background management unit places the background pattern sent from the PC in an unused state and manages the background pattern so that the background pattern can be reused.

11 Claims, 19 Drawing Sheets

30, 32, 16, 18, 20

PAPER 128, 130

| BACKGROUND PATTERN ID | POSITION DATA | VOICE DATA ID |

| VOICE DATA |

| ID OR NAME | AUTHENTICATION DATA | BACKGROUND PATTERN INFORMATION | POSITION DATA | SEAL IMPRESSION INFORMATION DATA | CONTACT |
|---|---|---|---|---|---| he# DATA MANAGEMENT SYSTEM AND METHOD

BACKGROUND OF THE INVENTION

1. Field of the Invention

This invention relates to a data management system and method used to manage a pattern data to specify an paper and so on.

2. Description of the Related Art

For example, JP-A-2001-105786 discloses a writing instrument suited to enter handwritten text information.

For example, "Anoto functionality" discloses a method for entering information using the apparatus disclosed in JP-A-2001-105786 or putting an appropriate pattern for determining paper on paper.

Since the pattern disclosed in "Anoto functionality" can also be used to locate a position on paper, it would be convenient to make it possible to print the pattern together with a graphic or text and use the pattern for outputting information associated with the position of the printed text or graphic in response to pointing to the printed text or graphic.

SUMMARY OF THE INVENTION

The present invention has been made in view of the above circumstances and provides a data management system and method for making it possible to manage pattern data reusable, the pattern data used to specify paper or something which has at least one surface where a mark can be added.

According to a first aspect of the invention, a data management system for managing a plurality of pieces of mark data indicating unique marks to be put on an object, the data management system includes: a first data management unit that, when an unused mark is used, manages a piece of mark data indicating the used mark as being in use; a second data management unit that, when the used mark becomes unused, managing a piece of mark data indicating the mark becoming in unuse as being unuse; and a data distribution unit that, when the unused mark is used, distributes one of pieces of mark data managed as being in unuse.

Preferably, the object includes a printing medium, which is one of a paper and a sheet-like medium; and the mark is to be printed on the printing medium.

Preferably, the printing medium includes at least one of a first print medium from which the printed mark cannot be erased and a second print medium from which the printed mark can be erased. When the unused mark is printed on the printing medium, the first data management unit manages a piece of mark data indicating the used mark as being in use. When the printing medium becomes unused or when the mark printed on the second print medium is erased, the second data management unit manages a piece of mark data indicating the mark printed on the first or second print medium as being unused.

According to a second aspect of the invention, a data management method for managing a plurality of pieces of mark data indicating unique marks to be put on an object, the data management method includes: managing a piece of mark data indicating the used mark as being in use when an unused mark is used; managing a piece of mark data indicating the mark becoming in unuse as being unuse when the used mark becomes unused; and distributing one of pieces of mark data managed as being in unuse when the unused mark is used.

According to a third aspect of the invention, a program for managing a plurality of pieces of mark data indicating unique marks to be put on an object, the program for causing a computer to execute: a first data management function that, when an unused mark is used, manages a piece of mark data indicating the used mark as being in use; a second data management function that, when the used mark becomes unused, managing a piece of mark data indicating the mark becoming in unuse as being unuse; and a data distribution function that, when the unused mark is used, distributes one of pieces of mark data managed as being in unuse.

The present invention makes it possible to manage pattern data reusable, the pattern data used to specify paper or something which has at least one surface where a mark can be added.

BRIEF DESCRIPTION OF THE DRAWINGS

FIG. 15A shows an index used to output voice data and FIG. 15B shows voice data referenced by the index;

FIG. 24A shows an index used to output addition data and FIG. 24B shows addition data referenced by the index;

DETAILED DESCRIPTION OF THE PREFERRED EMBODIMENTS

[Information Management System 1]

Figure 1:
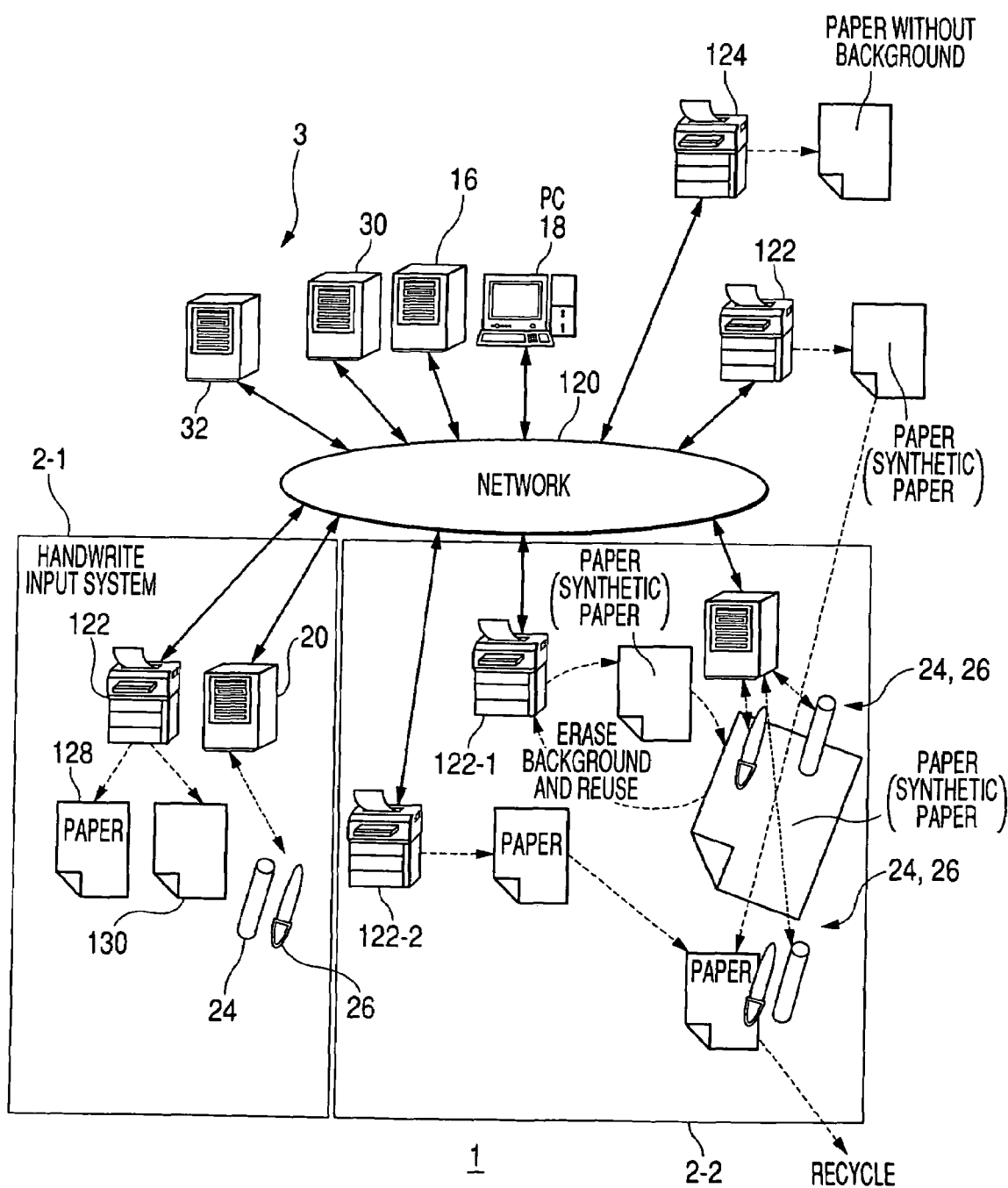
FIG. 1 is a drawing to show an outline of an information management system according to the invention.

FIG. 1 is a drawing to show an outline of an information management system 1 according to the invention.

To begin with, the information management system 1 incorporating the invention will be discussed.

As shown in FIG. 1, the information management system 1 includes handwrite input systems 2-1 and 2-2, a background management system 3, an authorized printer 122 authorized by the background management system 3 (mark addition unit), a non-authorized printer 124 not authorized by the background management system 3, an information server 16, a personal computer (PC) 18, an input unit 20 (the PC 18 may also serve as the input unit 20 and vice versa), and the like, which are connected through a network 120.

The handwrite input system 2-1, 2-2 is made up of an authorized printer 122, an input unit 20, an electronic authentication seal 24, a first handwrite input pen 26, and the like.

The background management system 3 is made up of a background management unit 32 and a charging unit 30.

In the description to follow, the handwrite input systems 2-1 and 2-2, etc., may be mentioned simply as the handwrite input system 2, etc.

The components of the information management system 1 may be collectively called nodes.

The numbers of the components of the information management system 1 shown in FIG. 1 are illustrative and the information management system 1 can include any numbers of the components.

The information management system 1 shown in FIG. 1 and sharing the functions among the nodes are illustrative, and the functions distributed through the network 120 in the information management system 1 may be collected in one node.

In contrast, the functions collected in one node may be distributed among a plurality of nodes or may be distributed through the network 120 among a plurality of nodes.

Thus, whether the components are collected in one unit or are distributed through a network, etc., among a plurality of units does not affect the technical scope of the invention.

Figure 2:
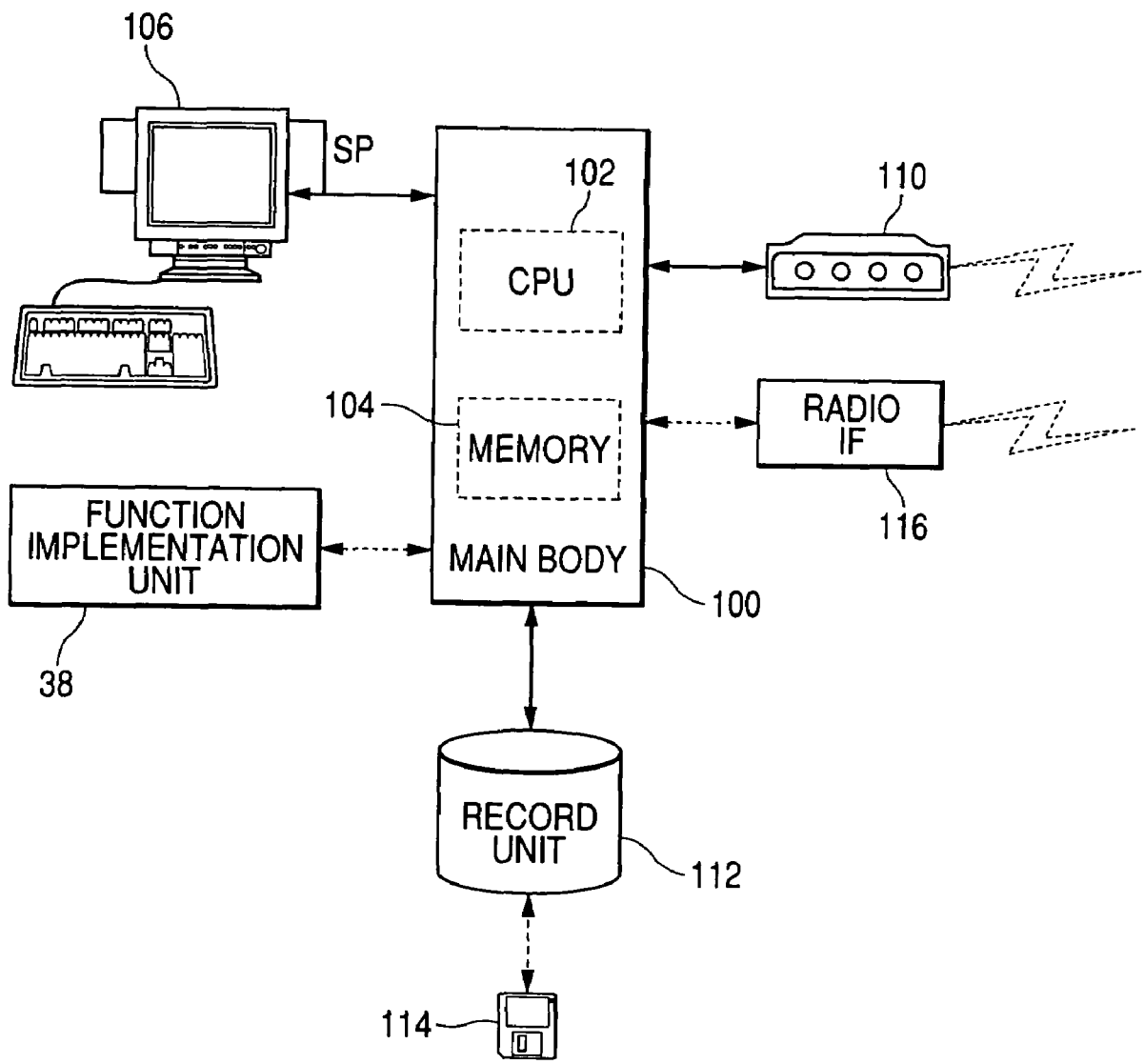
FIG. 2 is a drawing to illustrate the hardware configuration of a background management unit, a charging unit, an information server, a PC, an input unit, etc., shown in FIG. 1.

FIG. 2 is a drawing to illustrate the hardware configuration of the background management unit 32, the charging unit 30, the information server 16, the PC 18, the input unit 20, etc., shown in FIG. 1.

As shown in FIG. 2, each of the components of the information management system 1 is made up of a main body 100 including a CPU 102, memory 104, their peripheral circuitry, etc., an input/output unit 106 including a keyboard, a display, speakers (SPs), etc., a communication unit 110 for communicating with any other node through the network 120, a record unit 112 of a CD unit, an HDD unit, etc., and a function implementation unit 38 used to implement the functions peculiar to each unit such as a scanner.

This means that each of the background management unit 32, the charging unit 30, the information server 16, the PC 18, and the input unit 20 includes the components of a computer having a communication function.

Further, a radio interface (IF) 116 used for radio communications with the electronic authentication seal 24, the handwrite input pen 26, and the like (regardless of whether the communications are radio wave communications or light communications) is added to the configuration of the input unit 20, the PC 18, etc., shown in FIG. 2 as required.

The radio interface (IF) 116 can be replaced with a wire interface (IF) having a similar function to that of the radio interface (IF) depending on the configuration and use of the input unit 20 or the PC 18.

A printer engine (not shown) for implementing the function of a printer is added to the configuration of each of the authorized printer 122 and the non-authorized printer 124 shown in FIG. 2.

Figure 3:
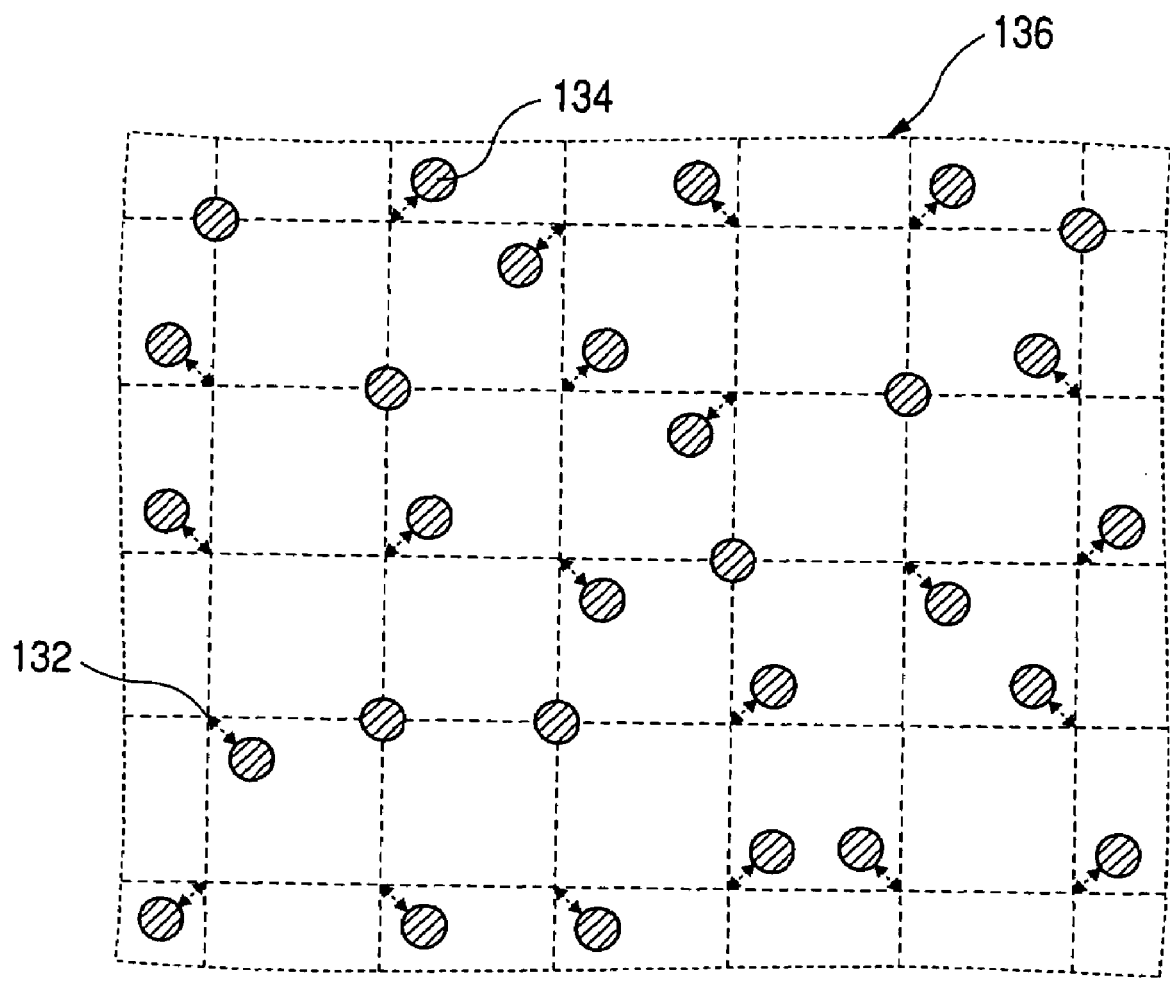
FIG. 3 is a drawing to illustrate a background added to paper shown in FIG. 1.

FIG. 3 is a drawing to illustrate a background added to paper 128, 130 shown in FIG. 1.

The paper 128 is ordinary paper and the paper 130 is synthetic paper for enabling print and erasion (reuse) more than once and the paper 128, 130 is provided with a background as shown in FIG. 3 by printing.

That is, for example, a background pattern 136 with dots 134 on lattice points 132 of a lattice formed of a large number of lines crossing each other vertically and horizontally with spacing of about 0.3 mm as assumed by dotted lines in FIG. 3 or at positions shifted about 20 μm, for example, left or right, top or bottom, upper right, lower right, upper left, and lower left with respect to the lattice points 132 is printed on the plain paper 128, 130 to produce the paper 128, 130 with the background.

The paper 128, 130 (object) may or may not be provided with the background pattern 136.

An enormous number of types of background patterns 136 are provided by combining the positional relationships among the lattice points 132 and a large number of dots 134.

Therefore, which part of the background pattern 136 the handwrite input pen 26 touches is detected, whereby which position on the paper 128, 130 the handwrite input pen 26 points to or writes can also be detected.

Since each of the paper 128 and the paper 130 can be provided with a virtually unique background pattern 136, if one background pattern 136 is printed only on one sheet of the plain paper 128, 130, the background pattern 136 can be used to specify the paper 128, 130 provided with the background pattern 136.

Here, the background pattern 136 (FIG. 3) is illustrated as a mark put on the paper 128, 130 and used for position identification of the paper 128, 130. However, not only an optically readable mark like the background pattern 136, but also an electrically, magnetically, or mechanically readable mark can be used as the mark.

Here, the case where the background pattern 136 is put on the two-dimensional paper 128, 130 is illustrated. However, the background pattern 136 may be put on a three-dimensional object so that a position on the object can be detected.

A proper graphic, pattern, or dot array rather than the background pattern 136 as shown in FIG. 3 may be put on the paper 128, 130 as the mark.

Alternatively, a three-dimensional member may be provided with a mark for making it possible to identify the three-dimensional coordinates (address) of the object so that the three-dimensional coordinates of the object can be detected.

Special toner (cubic toner) may be used on the surface or inside of the two-dimensional plain paper 128, 130 so that a three-dimensional background pattern is printed.

The paper 128, 130 provided with a background may be coated on the surface with translucent resin or glass or translucent resin or glass may be put on the surface.

The background pattern 136 put on the paper 128, 130 is managed by the background management unit 32 of the background management system 3 and is printed on the paper 128, 130 on the authorized printer 122.

The charging unit 30 charges the user for management and use of the background pattern 136.

The electronic authentication seal 24 is used together with the paper 128, 130 and conducts communications with the input unit 20 or the PC 18 for conducting electronic authentication.

The handwrite input pen 26 is used together with the paper 128, 130 and conducts communications with the input unit 20 or the PC 18 for handwritten text and graphics input, voice input, and any other operation.

The components can realize the following, for example, in the information management system 1:

(1) Printing the background pattern 136 (FIG. 3) on usual paper or synthetic paper and charging for the printing;

(2) reuse of the background pattern 136 printed on synthetic paper (if the background pattern 136 printed on synthetic paper is erased, management is conducted so that the background pattern 136 becomes printable on any other usual paper or synthetic paper;

(3) voice input/output (a memo described on the paper on something likes that has at least one surface where a mark can be added 128, 130 using the handwrite input pen 26 or similar devices and voice are stored in association with each other and when the user traces the memo with the handwrite input pen 26 or similar devices, the associated voice is played back);

(4) authentication of user with the handwrite input pen 26 or similar devices;

(5) authentication of user using the paper 128, 130 and the electronic authentication seal 24; and (6) various services using the paper 128, 130, the electronic authentication seal 24, and the handwrite input pen 26 (education service described later or service wherein if the user writes a comment into a document prepared with a word processor or corrects the document in handwriting and then goes near to a personal computer, the handwritten comment or correction portion of the document is displayed on the screen of the personal computer for convenience of work of again entering the handwritten comment or correction with the word processor).

[Handwrite Input Pen 26]

Figure 4:
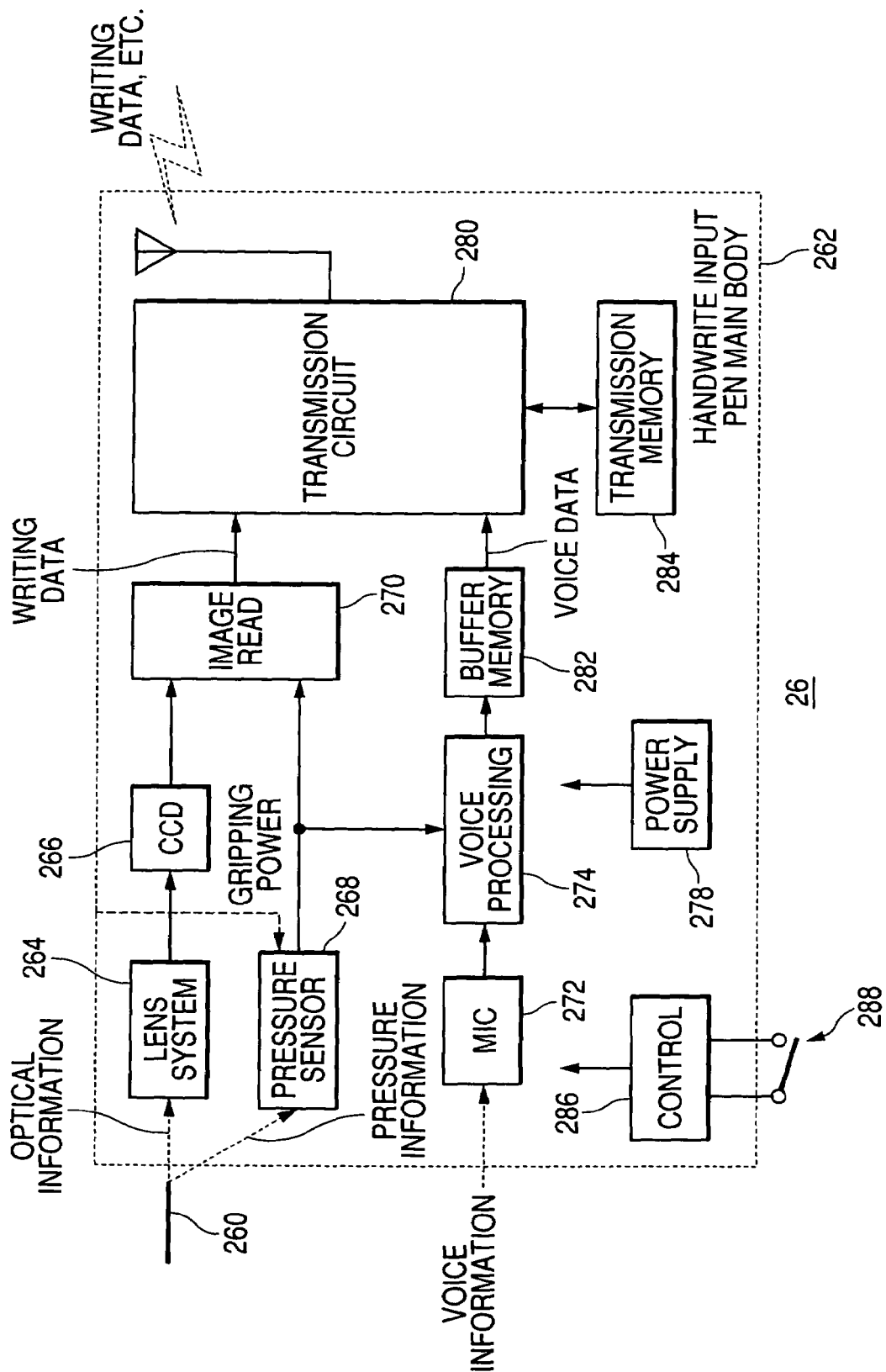
FIG. 4 is a drawing to show the configuration of a handwrite input pen shown in FIG. 1.

FIG. 4 is a drawing to show the configuration of the first handwrite input pen 26 or similar devices that can be used to write or point a position shown in FIG. 1.

As shown in FIG. 4, the handwrite input pen 26 is made up of a writing object 260 used for writing and pointing to, such as a sharp pencil mechanism or a ballpoint pen, and a handwrite input pen main body 262 formed like a general writing instrument in which a lens system 264, a CCD (charge-coupled device) 266, a pressure sensor 268, an image read circuit 270, a microphone (MIC) 272 (which may be externally connected to the handwrite input pen 26 and placed on a desk for use for voice input), a voice processing circuit 274, a power supply 278, a transmission circuit 280, buffer memory 282, transmission memory 284, a control section 286, and a switch 288 are housed in one piece.

The handwrite input pen 26 adopts the hardware configuration as a one-chip microprocessor application unit, for example, and the components of the handwrite input pen 26 are implemented appropriately as dedicated hardware or software operating on a one-chip microprocessor.

The handwrite input pen 26 outputs written text and/or graphics on the paper 128, 130 with a background (FIG. 1) or pointing operation to the input unit 20 as handwriting data by the components.

The handwrite input pen 26 receives ambient voice and outputs the voice to the input unit 20 as voice data.

The handwrite input pen 26 detects the tool force of the user and outputs the tool force to the input unit 20 as tool force data.

The handwrite input pen 26 is responsive to predetermined operation of the user, such as operation of a button (not shown) of the handwrite input pen 26 or pointing to the paper 128, 130 at a predetermined timing, for executing the corresponding function.

This means that the handwrite input pen 26 is used to input handwritten text, pointing operation, and voice to the input unit 20.

In the handwrite input pen 26, the pressure sensor 268 detects pressure put on the writing object 260 when the user presses the writing object 260 against the paper 128, 130, etc., and writes and points to, etc., and outputs the detected pressure to the image read circuit 270.

If the pressure sensor 268 is designed so as to be able to further detect the griping power of the user put on the handwrite input pen 26, user authentication based on the griping power of the user is made possible.

In the handwrite input pen 26, the lens system 264 and the CCD 266 accept an image of the background pattern 136

(FIG. 3), etc., of the paper 128, 130 of the portion against which the writing object 260 is pressed when the pressure sensor 268 detects pressure put on the writing object 260, for example, and outputs the image to the image read circuit 270.

The image read circuit 270 reads the image accepted by the lens system 264 and the CCD 266, generates handwriting data indicating the handwriting of the user and the background pattern 136 (FIG. 3) put on the paper 128, 130, and outputs the handwriting data to the transmission circuit 280 via the buffer memory 282.

The image read circuit 270 reads the pressure detected by the pressure sensor 268, generates tool force data indicating the tool force of the user or the strength of pointing, and outputs the tool force data to the transmission circuit 280 via the buffer memory 282.

The MIC 272 and the voice processing circuit 274 accept ambient voice always or when the pressure sensor 268 detects pressure put on the writing object 260, generates voice data, and outputs the voice data to the transmission circuit 280.

The control section 286 controls the operation of the components of the handwrite input pen 26 as the user operates the switch 288.

An operation control example of the control section 286 is as follows: Voice data is previously stored in the buffer memory 282 or the transmission memory 284 and as the user operates the switch 288, the transmission circuit 280 is controlled so as to transmit the stored voice data.

The transmission circuit 280 receives the handwriting data, the tool force data, and the voice data via the buffer memory 282 from the image read circuit 270 and the voice processing circuit 274 and stores the data in the transmission memory 284 under the control of the control section 286.

Further, the transmission circuit 280 transmits the data stored in the buffer memory 282 and handwriting data, tool force data, and voice data input by radio wave or light to the radio IF 116 (FIG. 2) of the input unit 20 (FIG. 1) under the control of the control section 286.

The control section 286 may be caused to store the encrypted identification code or number unique to each handwrite input pen 26 and the transmission circuit 280 may transmit the identification code or number together with the data described above.

[Other Forms of Handwrite Input Pen]

Various forms of handwrite input pens that can be used instead of the handwrite input pen 26 in the information management system 1 will be discussed.

Figure 5:
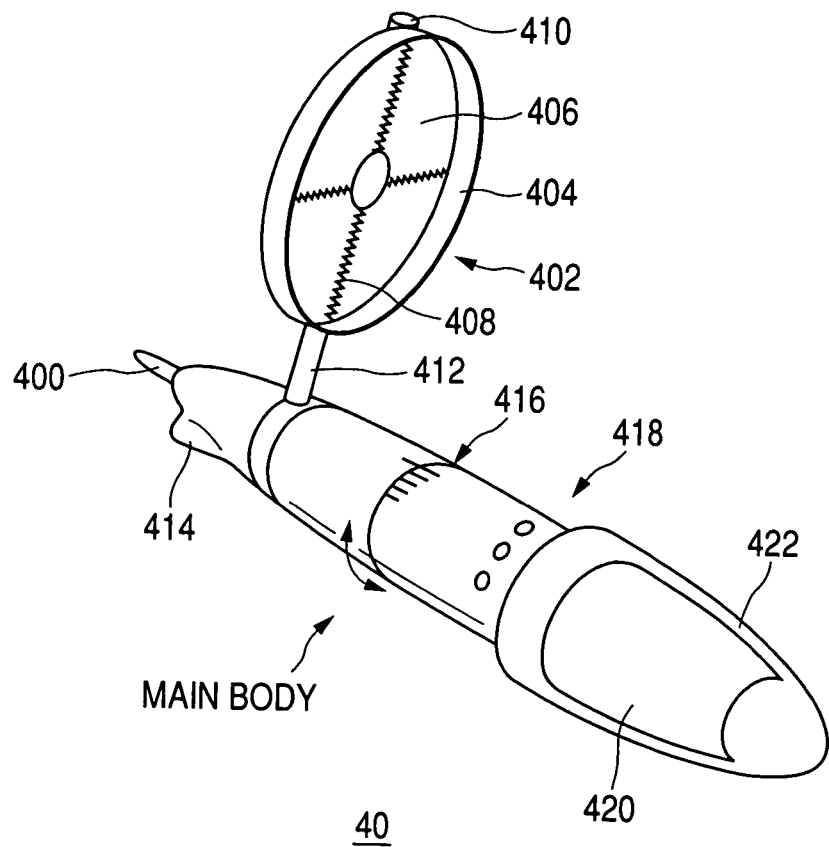
FIG. 5 is a drawing to show the appearance of a second handwrite input pen used instead of the first handwrite input pen shown in FIG. 4, etc., in the information management system of FIG. 1.
Figure 6:
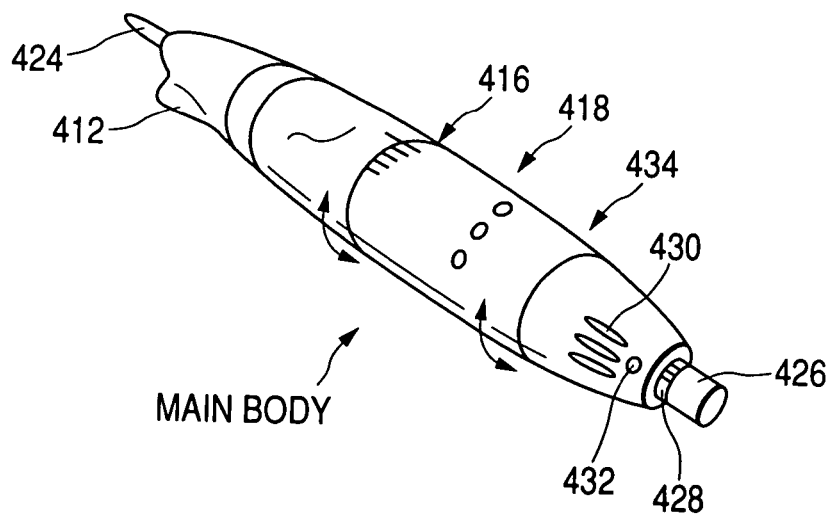
FIG. 6 is a drawing to show the appearance of a third handwrite input pen used instead of the first handwrite input pen shown in FIG. 4, etc., in the information management system of FIG. 1.

FIGS. 5 and 6 are drawings to show the appearances of second and third handwrite input pens 40 and 42, respectively, used instead of the first handwrite input pen 26 shown in FIG. 4, etc., in the information management system 1 (FIG. 1).

In FIGS. 5 and 6, substantially identical components are denoted by the same reference numerals.

As shown in FIG. 5, the second handwrite input pen 40 is made up of a contact object 400, a magnifying glass 402, a CCD camera 412, a function switch section 416, a function indication LED 418, a sheet-like display 420 containing an organic EL display, a cap 422, and the like.

The thickest portion of the main body of the handwrite input pen 40 has a thickness of 4 cm or less in diameter (a diameter smaller than that of a loop formed by a thumb and a forefinger of a grownup), for example, considering ease of grip.

Further, the second handwrite input pen 40 has components for supporting the functions as described below with reference to FIG. 5 under the control of the control section 288 in addition to the functions of the first handwrite input pen 26 shown in FIG. 4 (like the third handwrite input pen 42 (FIG. 6)).

The contact object 400 corresponds to the writing object 260 of the first handwrite input pen 26 and is implemented as a ball-point pen, a pointing rod, a needle, a pencil, a marker pen, felt, a resin with a round tip, or the like for coming in contact with an object such as the paper 128, 130.

The contact object 400 is used not only for text input and pointing, but also for selection of a function responsive to the tool force.

The magnifying glass 402 is made up of a magnifying lens 406 fitted into a lens frame 404 and provided with a sight scale 408 and an illumination light 410 attached to the lens frame 404 for illuminating a portion near the user at hand.

The lens frame 404 can be attached to and detached from the main body and is fixed to the main body by a joint 412 for flexibly fixing the lens frame 404 to the main body.

The CCD camera 414 corresponds to the lens system 264 and the CCD 266 in the first handwrite input pen 26 (FIG. 4) and is used not only to input handwritten text input, but also to take a photograph like a general digital camera.

The function switch section 416 corresponds to the switch 288 (FIG. 4) of the first handwrite input pen 26, for example, and is used for selecting a function of the handwrite input pen 40 as indicated by the arrow in FIG. 5.

The functions of the handwrite input pen 40 include, for example, voice input/voice playback, etc., voice buffering time setting, function locking, etc.

To select one of the functions, the user rotates the joint part of the main body for setting the graduation indicating the function to be selected.

The function indication LED 418 is made up of light emitting diodes, etc., different in color for indicating the selected function.

In the main body of the handwrite input pen 40, a power switch (not shown) is provided in the portion in which the cap 422 is placed. When the user removes the cap 422 covering the contact object 400 and places the cap 422 in the predetermined portion, the power of the handwrite input pen 40 is turned on. In the main body of the handwrite input pen 40, the display 420 formed like a cylinder is provided in the portion in which the cap 422 is placed for producing various displays.

As shown in FIG. 6, the third handwrite input pen 42 is provided with a contact object 424 in place of the contact object 400 and is provided with a knock-type function switch section 426, a directional microphone 430, and a directivity adjustment section 434 in place of the display 420.

In the handwrite input pen 42, the knock-type function switch section 426 used to turn on/off the voice buffering function, etc., may be used together with a function switch section 416 and a function indication LED 418. Whenever the user presses the knock-type function switch section 426, the function of the handwrite input pen 42 is changed and the selected function is displayed on a function display section 428 in a color, etc.

If the user turns the directivity adjustment section 434 provided in the joint part of the main body, the directivity of the directional microphone 430 is adjusted and the directivity of the directional microphone 430 is indicated by a mark 432 indicating the directivity.

[Electronic Authentication Seal 24]

Figure 7:
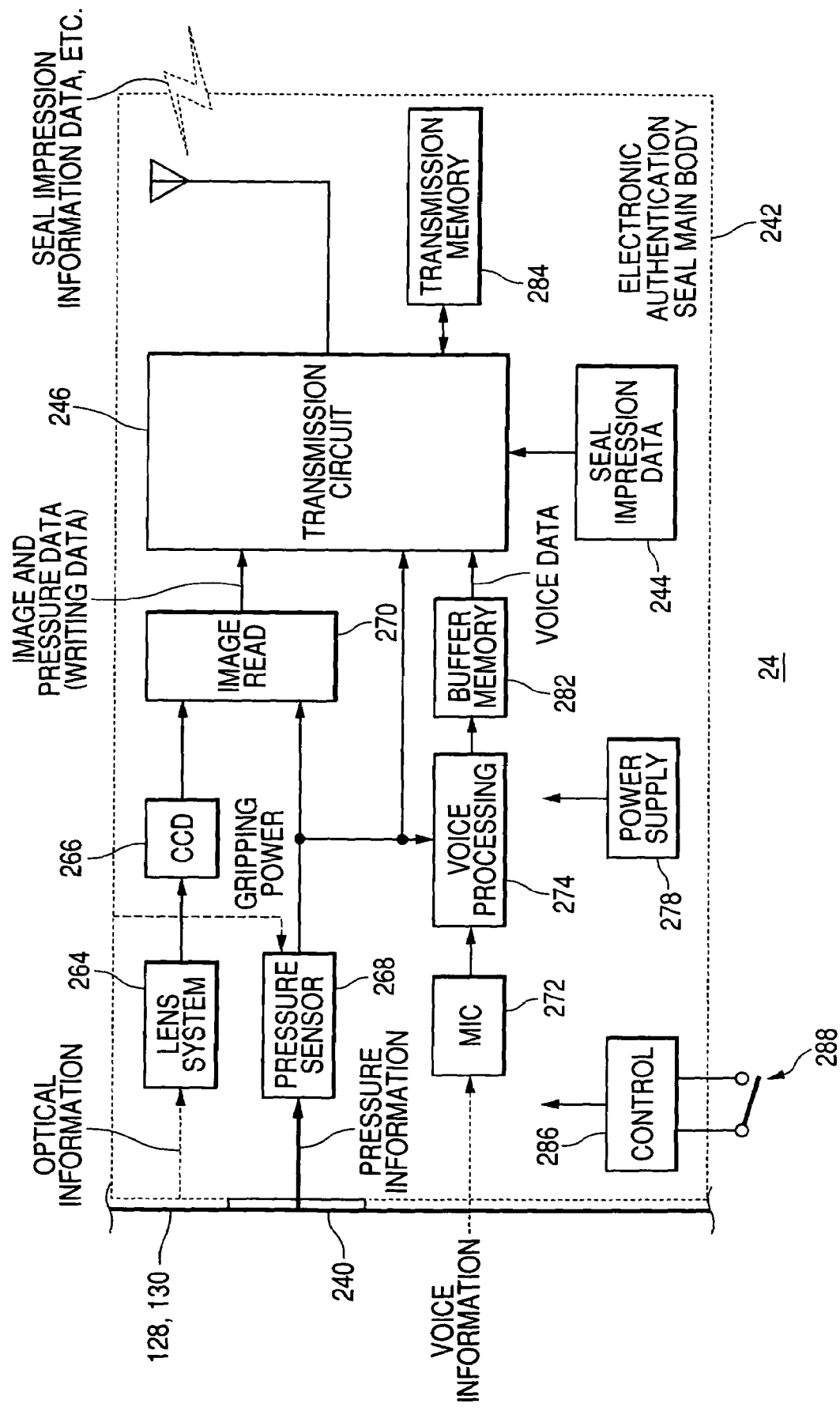
FIG. 7 is a drawing to show the configuration of an electronic authentication seal shown in FIG. 1.

FIG. 7 is a drawing to show the configuration of the electronic authentication seal 24.

As shown in FIG. 7, the electronic authentication seal 24 includes a lens system 264, a CCD 266, a pressure sensor 268, an image read circuit 270, a MIC 272, a voice processing circuit 274, a power supply 278, buffer memory 282, transmission memory 284, a control section 286, a switch 288, a seal face 240, a seal impression data storage section 244, and a transmission circuit 246, which are housed in an electronic authentication seal main body 242 formed like a general seal.

Like the handwrite input pen 26, the electronic authentication seal 24 adopts the hardware configuration as a one-chip microprocessor application unit, for example, and the components of the electronic authentication seal 24 are implemented appropriately as dedicated hardware or software operating on a one-chip microprocessor.

The electronic authentication seal 24 conducts user authentication with the information server 16, etc., by the components.

The electronic authentication seal 24 also outputs electronic seal impression information data to the input unit 20, the information server 16, and the like.

In the electronic authentication seal 24, the seal face 240 is abutted against the paper 128, 130, etc., and gives a seal impression and also transmits the received pressure to the pressure sensor 268.

As with the handwrite input pen 26, if the pressure sensor 268 is designed so as to be able to detect the griping power of the user put on the electronic authentication seal main body 242, user authentication using the electronic authentication seal 24 is made possible.

The seal impression data storage section 244 retains the seal impression data (which may contain the identification code or number similar to that with the handwrite input pen 26) to be output from the electronic authentication seal 24 to the input unit 20, etc., and outputs the seal impression data to the transmission circuit 246.

The transmission circuit 246 generates seal impression information data containing image and pressure data indicating the image of the background pattern 136 (FIG. 3) on the paper 128, 130 input from the image read circuit 270, the pressure detected by the pressure sensor 268, and the like (similar to the handwriting data in the handwrite input pen 26), the seal impression data input from the seal impression data storage section 244, and the voice data input from the voice processing circuit 274.

Like the transmission circuit 280 in the handwrite input pen 26, the transmission circuit 246 outputs the generated seal impression information data to the input unit 20 or the PC 18 under the control of the control section 288.

[Input Unit Program 200]

Figure 8:
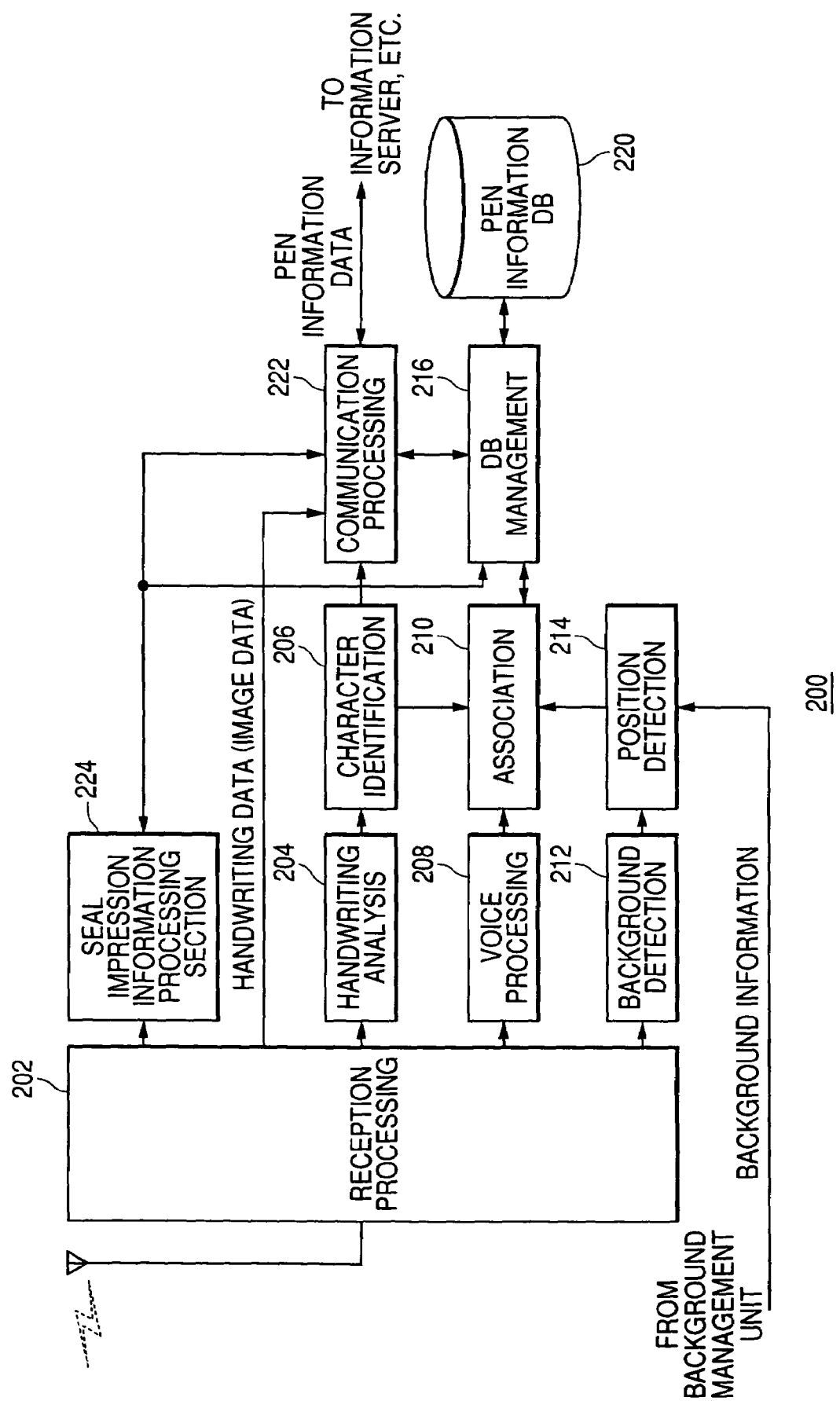
FIG. 8 is a drawing to show an input unit program operating in the input unit shown in FIG. 1.

FIG. 8 is a drawing to show an input unit program 200 operating in the input unit 20 shown in FIG. 1.

As shown in FIG. 8, the input unit program 200 is made up of a reception processing section 202, a handwriting analysis section 204, a character identification section 206, a voice processing section 208, an association section 210, a background detection section 212, a position detection section 214 (detection unit), a database (DB) management section 216, a pen information DB 220, a communication processing section 222, and a seal impression information processing section 224.

The input unit program 200 is supplied to the input unit 20 through a record medium 114 (FIG. 2), for example, and is loaded into the memory 104 for execution (like programs described below).

The input unit program 200 processes the handwriting data, the tool force data, and the voice data input from the handwrite input pen 26, associates the data with each other, and transmits the data to the information server 16 (FIG. 1) by the components.

In the input unit program 200, the reception processing section 202 outputs the handwriting data and the tool force data received at the radio IF 116 (FIG. 2) of the input unit 20 to the handwriting analysis section 204.

The reception processing section 202 also outputs the voice data received at the radio IF 116 to the voice processing section 208.

The reception processing section 202 also outputs the handwriting data to the background detection section 212.

The reception processing section 202 also outputs the handwriting data, the voice data, the tool force data, the image and pressure data, and the seal impression data obtained from the electronic authentication seal 24 and the handwrite input pen 26 to the communication processing section 222, as required.

The handwriting analysis section 204 obtains information indicating the background pattern 136 from the background management unit 32, for example, analyzes the handwriting data and the tool force data input from the reception processing section 202, detects the position of the start point of the line written on the paper 128, 130 by the user, and further calculates the move direction and the move speed of the dots 134 of the background pattern 136 (FIG. 3).

The handwriting analysis section 204 outputs the analysis result thus provided to the character identification section 206.

The character identification section 206 identifies the characters written on the paper 128, 130 by the user based on the analysis result of the handwriting analysis section 204 and outputs the text data to the association section 210.

The character identification section 206 also identifies operation of pointing, etc., for the paper 128, 130 by the user based on the analysis result of the handwriting analysis section 204 and outputs the operation data to the association section 210.

The character identification section 206 may output the analyzed handwriting data and the analyzed tool force data to the association section 210 together with the text data and the operation data.

When input of handwritten text is permitted as the result of user authentication, the character identification section 206 transmits the text data to the communication processing section 222.

The voice processing section 208 performs processing of compression, coding, buffering, etc., for the voice data input from the reception processing section 202 and outputs the data to the association section 210.

The background detection section 212 detects the background pattern 136 (FIG. 3) put on the paper 128, 130 from the handwriting data (image) input from the reception processing section 202 and outputs the background pattern 136 to the position detection section 214.

The position detection section 214 receives the information indicating the background pattern 136 put on the paper 128, 130 (also called background pattern data) from the background management unit 32, detects the position on the paper 128, 130 written or pointed to by the handwrite input pen 26, and outputs the position data indicating the position on the paper 128, 130 to the association section 210.

The association section 210 associates the text data and the operation data input from the character identification section 206 (to which the handwriting data and the tool force data may be added as described above), the voice data input from the voice processing section 208, and the position data input from the position detection section 214 with each other, and outputs pen information data to the DB management section 216.

The seal impression information processing section 224 receives the seal impression information data from the electronic authentication seal 24 and outputs the seal impression information data to the information server 16, etc., through the communication processing section 222, for example, at the timing at which the pressure applied to the seal face 240 changes largely.

The seal impression information processing section 224 also outputs the seal impression information data received from the electronic authentication seal 24 to the DB management section 216.

When user authentication using the electronic authentication seal 24 is conducted, the seal impression information processing section 224 outputs the seal impression information data received from the electronic authentication seal 24 to the information server 16 or the DB management section 216 only when the user with the electronic authentication seal 24 is authenticated.

The communication processing section 222 performs processing required for communications with any other node through the network 120 (FIG. 1).

The DB management section 216 stores the pen information data input from the association section 210 and the seal impression information data input from the seal impression information processing section 224 in the pen information DB 220 for management.

The DB management section 216 also transmits the pen information data and the seal impression information data stored in the pen information DB 220 to the information server 16, etc., through the communication processing section 222, as required.

The DB management section 216 also outputs the stored pen information data and the stored seal impression information data from the input/output unit 106, etc., as text data or voice data in response to user's operation.

When the information server 16 conducts user authentication using the handwrite input pen 26, the DB management section 216 transmits only the pen information data entered by the user authenticated by the information server 16 to an other node through the communication processing section 222 or stores only the pen information data in the pen information DB 220 for management.

When the information server 16 authenticates the electronic authentication seal 24, the DB management section 216 transmits only the seal impression information input from the electronic authentication seal 24 authenticated by the information server 16 to any other node through the communication processing section 222 or stores only the seal impression information in the pen information DB 220 for management.

[Information Server Program 160]

Figure 9:
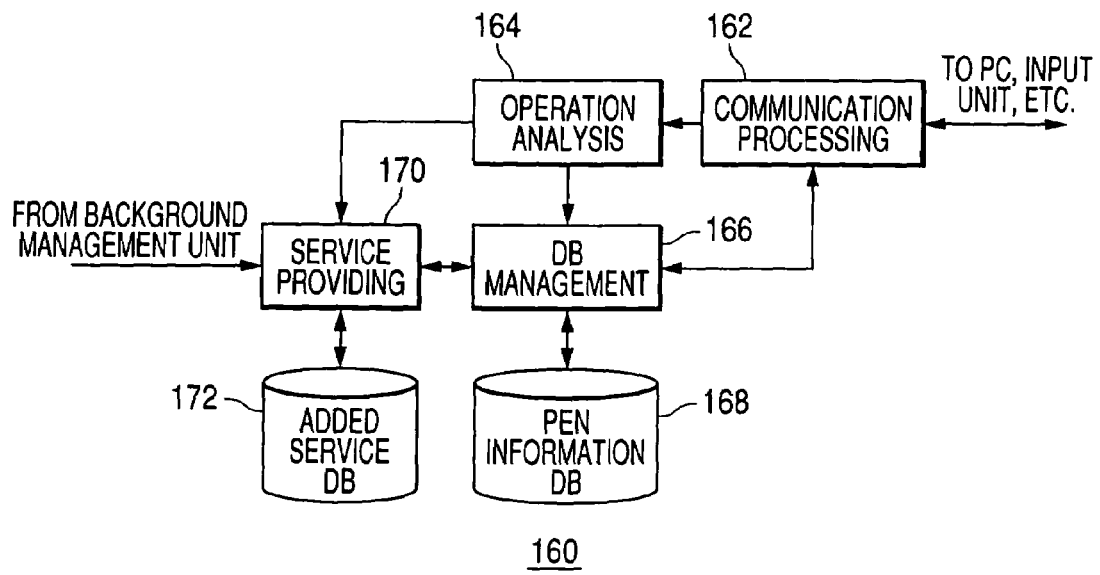
FIG. 9 is a drawing to show an information server program operating in the information server shown in FIG. 1.

FIG. 9 is a drawing to show an information server program 160 operating in the information server 16 shown in FIG. 1.

As shown in FIG. 9, the information server program 160 is made up of a communication processing section 222, an operation analysis section 164, a DB management section 166, a pen information DB 168, a service providing section 170 (specifying unit, data output unit), and an added service DB 172 (data storage section).

The information server program 160 stores and manages the pen information data and the seal impression information data input from each input unit 20 by the components and provides the stored pen information data for the PC 18, etc., as required.

The information server program 160 also provides added service for the PC 18, etc.

The communication processing section 222 performs processing required for communications with any other node through the network 120 (FIG. 1) like the communication processing section 222 in the input unit program 200 (FIG. 8).

The DB management section 166 receives the pen information data and the seal impression information data from the input unit 20, etc., and stores the data in the pen information DB 168 for management.

Upon reception of a request from any other node such as the PC 18 or the service providing section 170, the DB management section 166 provides the pen information data and the seal impression information data stored in the pen information DB 168.

The operation analysis section 164 analyzes the operation data, the pen information data, and the seal impression information data from the input unit 20, etc., and outputs the data to the service providing section 170.

The service providing section 170 provides the added service (education service, etc.,) stored in the added service DB 172 for the PC 18, the input unit 20, and the like appropriately using the pen information data and the seal impression information data stored in the pen information DB 168 and the background pattern data input from the background management unit 32 in response to the analysis result of the operation analysis section 164.

The added service provided by the service providing section 170 is described later with reference to a first embodiment and the later embodiments.

[Information Use Program 180]

Figure 10:
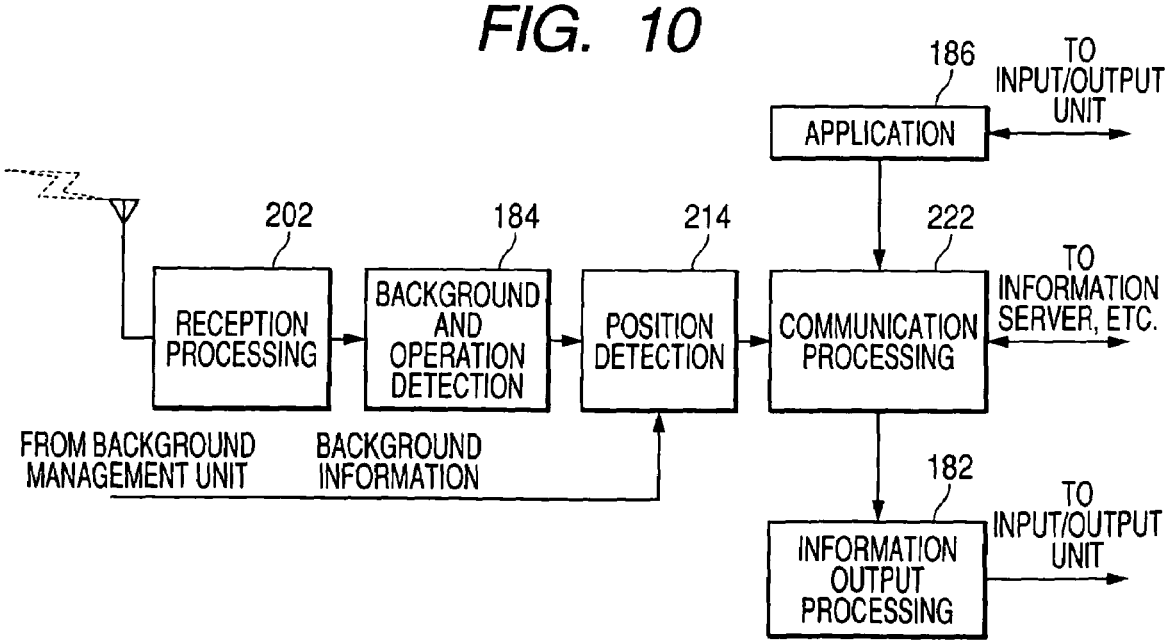
FIG. 10 is a drawing to show an information use program operating in the PC shown in FIG. 1.

FIG. 10 is a drawing to show an information use program 180 operating in the PC 18 shown in FIG. 1.

As shown in FIG. 10, the information use program 180 is made up of a reception processing section 202, a background and operation detection section 184, a position detection section 214, a communication processing section 222, an information output processing section 182 (second voice output unit), and an application 186 (data generator).

When the information use program 180 further handles seal impression information data, the seal impression information processing section 224 previously described with reference to FIG. 8 is added.

The information output processing section 182 provides various services by the components as the user points to the paper 128, 130 using the handwrite input pen 26.

To specify and clarify the description to follow, the case where the information use program 180 provides voice output service (voice input/output service described later in detail with reference to FIGS. 12 and 13) in response to user's pointing operation is taken as a specific example.

The reception processing section 202 receives handwriting data and tool force data from the handwrite input pen 26 through the radio IF 116 (FIG. 2) and outputs the data to the background and operation detection section 184.

The background and operation detection section 184 detects the background pattern 136 from the handwriting data input from the reception processing section 202 (image of background pattern 136 (FIG. 3)).

The background and operation detection section 184 also detects user's operation from the tool force data input from the reception processing section 202 and generates operation data.

The background and operation detection section 184 outputs the background pattern data and the operation data to the position detection section 214.

[Background Pattern 136 Addition Processing Performed by Application 186]

The application 186 contains the function of a word processor, etc., for example, and creates image data to be printed on the paper 128, 130 and addition data associated with each position on the paper 128, 130.

Creation of the image data by the application 186 can also include data copy, cut, insertion, and the like of a document created by another application (not shown) and a photograph image taken by a digital camera, for example.

Further, the application 186 requests the background management unit 32 (FIG. 1) to add the background pattern 136 (FIG. 3) to plain paper 128, 130 in response to user's operation and receives the background pattern 136 from the background management unit 32 responsive to the request.

The application 186 transmits the background pattern 136 received from the background management unit 32 to the authorized printer 122 together with the created image data and causes the printer to print the background pattern 136 and the image data on the plain paper 128, 130.

Further, the application 186 registers information indicating the background pattern 136 put on the plain paper 128, 130, one or more positions on the paper 128, 130, and addition data associated with each of the positions in the information server 16.

[Reuse of Background Pattern 136 by Application 186]

The application 186 implements the function for reuse of the background pattern 136.

That is, for example, the application 186 reads the background pattern 136 through a scanner (function implementation unit 38 (FIG. 2)), etc., from the paper 128 to be discarded or the paper 130 from which the background pattern 136 is to be erased, and transmits the background pattern 136 to the background management unit 32 (FIG. 1, etc.,) in the background management system 3.

Further, the application 186 sends a message to the effect that the background pattern 136 can be reused to the background management unit 32 together with transmission of the background pattern 136.

The position detection section 214 uses the background pattern data received from the background management unit 32 to detect the position on the paper 128, 130 pointed to by the user, and outputs the position data to the communication processing section 222 together with operation data.

The communication processing section 222 sends the position data input from the position detection section 214 to the information server 16, and requests the information server 16 to send the pen information data corresponding to the position on the paper 128, 130 detected by the position detection section 214.

The communication processing section 222 receives the pen information data responsive to the request from the information server 16 and outputs the pen information data to the information output processing section 182.

When the information server 16 conducts user authentication using the handwrite input pen 26, like the DB management section 216 of the information server program 160 (FIG. 8), the communication processing section 222 outputs only the pen information data entered by the user authenticated by the information server 16 to the information output processing section 182 or any other node.

The information output processing section 182 outputs the voice data contained in the pen information data input from the communication processing section 222 from the input/output unit 106 (FIG. 9).

[Background Management Program 34]

Figure 11:
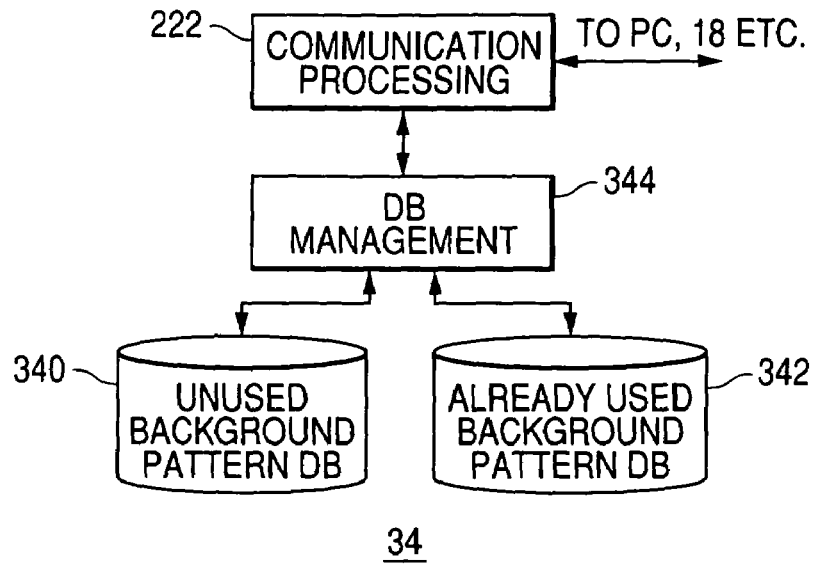
FIG. 11 is a drawing to show a background management program operating in the background management unit shown in FIG. 1.

FIG. 11 is a drawing to show a background management program 34 operating in the background management unit 32 shown in FIG. 1.

As shown in FIG. 11, the background management program 34 is made up of an unused background pattern DB 340, an already used background pattern DB 342, a DB management section 344, and a communication processing section 222.

The background management program 34 manages which background pattern is put on each of the paper 128 and the paper 130 by the components.

The background management program 34 also distributes the background pattern 136 to each node in the information management system 1 and reuses the background pattern 136.

The communication processing section 222 performs processing required for communications with any other node through the network 120 (FIG. 1) like the communication processing section 222 in the input unit program 200 (FIG. 8), etc.

The unused background pattern DB 340 stores background pattern data indicating the background pattern 136 put on neither the paper 128 nor 130.

The already used background pattern DB 342 stores background pattern data indicating the background pattern 136 put on the paper 128, 130.

Upon reception of a request to send an unused background pattern 136 from any other node such as the PC 18, the DB management section 344 selects an unused background pattern 136 stored in the unused background pattern DB 340 and distributes the unused background pattern 136 to the requesting node.

The DB management section 344 further deletes the background pattern data of the distributed background pattern 136 from the unused background pattern DB 340 and stores the background pattern data in the already used background pattern DB 342 for management.

Upon reception of the background pattern 136 together with a message to the effect that the background pattern 136 becomes unused from any other node, the DB management section 344 deletes the background pattern data of the received background pattern 136 from the already used background pattern DB 342 and stores the background pattern data of the received background pattern 136 in the unused background pattern DB 340.

First Embodiment

[Voice Input/output Provided by Information Management System 1]

Figure 12:
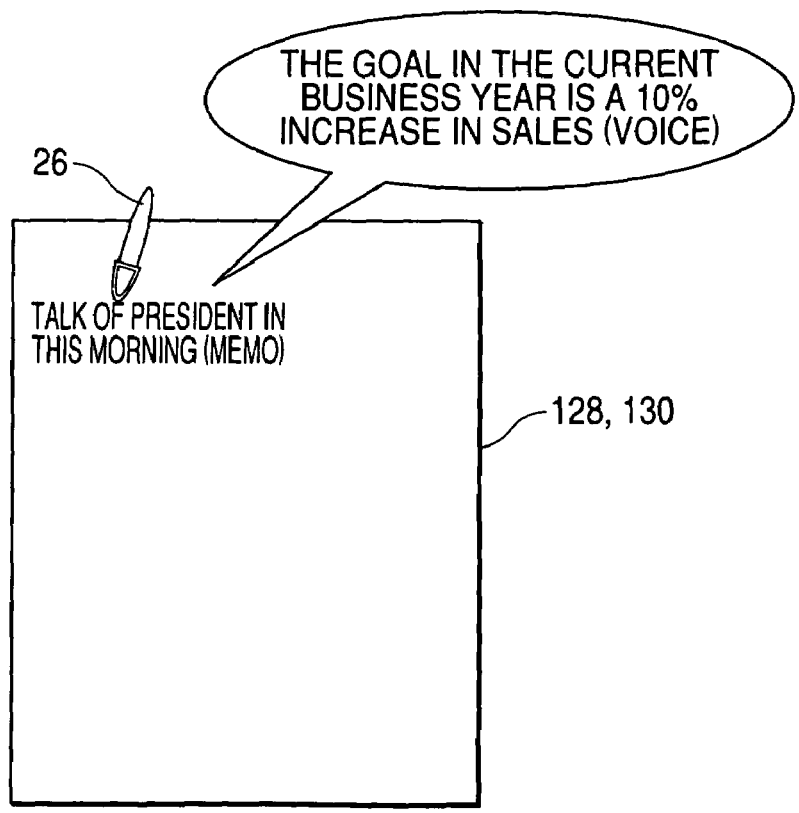
FIG. 12 is a drawing to illustrate voice input/output service provided by the information management system of FIG. 1.

FIG. 12 is a drawing to illustrate voice input/output service provided by the information management system 1 (FIG. 1).

The voice input/output service in the information management system 1 is implemented as the user performs the following operation as shown in FIG. 12;

(1) The user operates the handwrite input pen 26 (FIG. 1, FIG. 4) to set a state in which voice ("the goal in the current business year is a 10% increase in sales" illustrated in FIG. 12) is accepted.

(2) The user makes a memo ("talk of president in this morning" illustrated in FIG. 12) on the paper 128, 130 with a background using the handwrite input pen 26 near the input unit 20.

(3) The user points to the memo on the paper 128, 130 near the PC 18 to output voice.

As the user performs the operation described above, the input unit 20 accepts voice around the handwrite input pen 26 to generate voice data, associates the voice data with the position data of the memo on the paper 128, 130 with the background, and sends pen information data to the information server 16.

If the user points to the position of the memo on the paper 128, 130 with the background to output voice near the PC 18, the PC 18 requests the information server 16 to send the pen information data containing the voice data associated with the position of the memo.

The information server 16 sends the pen information data responsive to the request to the PC 18.

The PC 18 outputs the voice data contained in the pen information data from the input/output unit 106 (FIG. 2) as voice.

The voice input/output service in the information management system 1 will be discussed in more detail with reference to FIG. 13.

Figure 13:
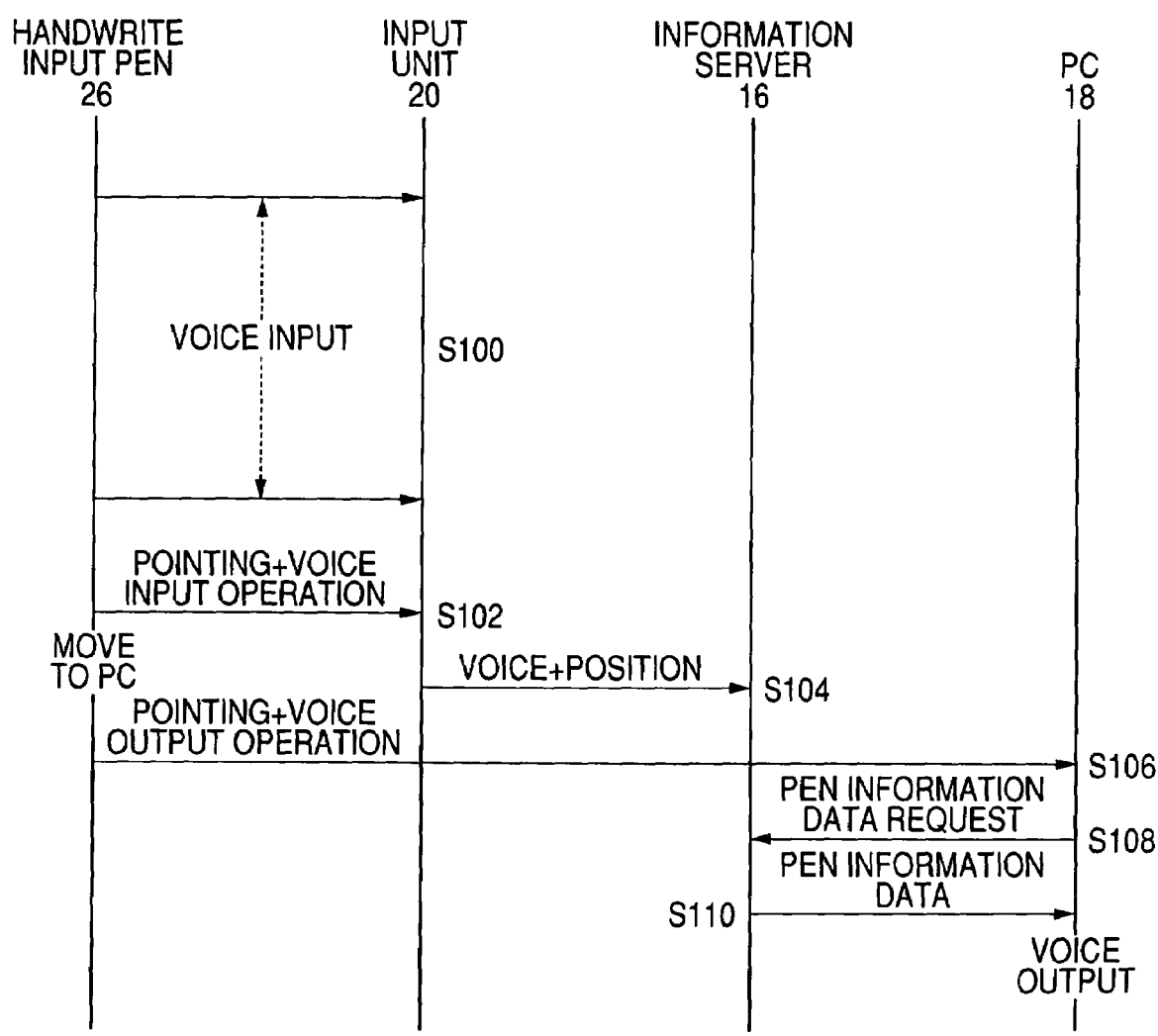
FIG. 13 is a chart to show a communication sequence S10 to implement the voice input/output service shown in FIG. 12 in the information management system 1 of FIG. 1.

FIG. 13 is a chart to show a communication sequence (S10) to implement the voice input/output service shown in FIG. 12 in the information management system 1 (FIG. 1).

As shown in FIG. 13, at step 100 (S100), the handwrite input pen 26 accepts ambient voice and outputs voice data to the input unit 20 in sequence.

At step 102 (S102), the user makes a memo on the paper 128, 130 with a background using the handwrite input pen 26 near the input unit 20, thereby pointing to the position on the paper 128, 130 and performs predetermined operation to input voice (the predetermined operation may be operation of simply detaching the handwrite input pen 26 from the paper 128, 130).

The handwrite input pen 26 transmits the operation to the input unit 20.

At step 104 (S104), the input unit 20 associates the position data of the memo on the paper 128, 130 with the background and the voice data provided at S100 with each other to generate pen information data, and transmits the pen information data to the information server 16.

The information server 16 receives and stores the pen information data for management.

At step 106 (S106), the user moves near the PC 18, points to the memo on the paper 128, 130 with the background using the handwrite input pen 26, and performs predetermined operation to output voice (for example, points to the position of the memo successively twice).

The handwrite input pen 26 transmits the handwriting data and the tool force data responsive to the pointing and the operation to the PC 18.

At step 108 (S108), the PC 18 requests the information server 16 to send the pen information data containing the position data indicating the position of the memo.

At step 110 (S110), the information server 16 transmits the pen information data containing the position data sent from the input unit 20 to the PC 18.

Upon reception of the pen information data from the information server 16, the PC 18 outputs the voice data contained in the pen information data from the input/output unit 106 (FIG. 2) as voice.

Second Embodiment

[Education Service]

Figures 14, 15A, 15B:
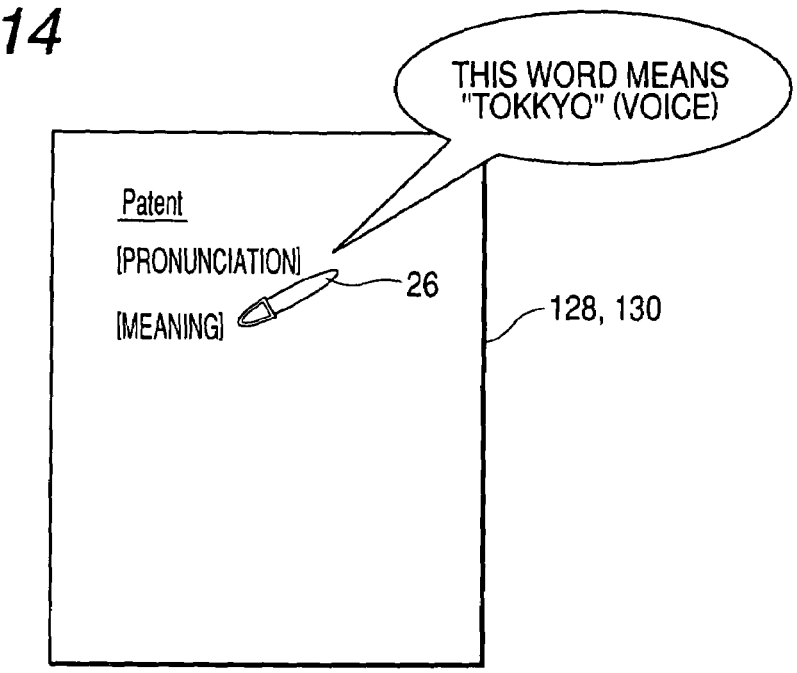
FIG. 14 is a drawing to illustrate education service provided by the information management system 1 of FIG. 1.
FIGS. 15A and 15B are drawings to illustrate data stored in an added service DB of FIG. 9 of the information server to implement the education service shown in FIG. 14.

FIG. 14 is a drawing to illustrate education service provided by the information management system 1 (FIG. 1).

Here, the case where English education service is provided by the information management system 1 is taken as a specific example.

As shown in FIG. 14, an English word (Patent) is printed on the paper 128, 130 with a background and further a button for the user to listen to the pronunciation of the English word and a button for the user to listen to the meaning of the English word are printed at predetermined positions on the paper 128, 130.

If the user points to the PRONUNCIATION button of the paper 128 with the background using the handwrite input pen 26 (FIG. 1, FIG. 4), the pronunciation of the English word corresponding to the background pattern 136 (FIG. 3) of the paper 128, 130 (in this case, Patent) is output in voice.

If the user points to the MEANING button of the paper 128 with the background, the meaning of the English word corresponding to the background pattern 136 of the paper 128, 130 (tokkyo) is output in voice.

If the user points to any position on the paper 128, 130 other than the buttons, a message to the effect that there is no information corresponding to the portion is output in voice or as an image.

FIGS. 15A and 15B are drawings to illustrate data stored in the added service DB 172 (FIG. 9) of the information server 16 to implement the education service previously described with reference to FIG. 14; FIG. 15A shows an index used to output voice data and FIG. 15B shows voice data referenced by the index.

To implement the education service shown in FIG. 14, for example, the data as shown in FIG. 15 is stored in the added service DB 172.

First, when the user points to a position on the paper 128, 130 with a background as shown in FIG. 14, the PC 18 sends the background pattern data of the paper 128, 130 (FIG. 14) and the position data indicating the position on the paper 128, 130 pointed to by the user to the information server 16.

The service providing section 170 of the information server 16 (FIG. 9) associates the background pattern data from the PC 18 and the identifier of the background pattern 136 (ID; background pattern ID) with each other.

Further, the service providing section 170 uses the background pattern ID and the position data indicating the pointing position from the PC 18 to search for the index shown in FIG. 15A, and obtains the identifier of the voice data corresponding to the information (voice data ID).

The service providing section 170 returns the voice data corresponding to the voice data ID thus obtained (FIG. 15B) to the PC 18.

Alternatively, the service providing section 170 notifies the PC 18 that no voice data exists when the voice data ID corresponding to the background pattern ID and the position data is not obtained.

The PC 18 outputs the voice data thus obtained from the input/output unit 106 (FIG. 2) or indicates nonexistence of voice data on the input/output unit 106 in voice or as an image.

Figure 16:
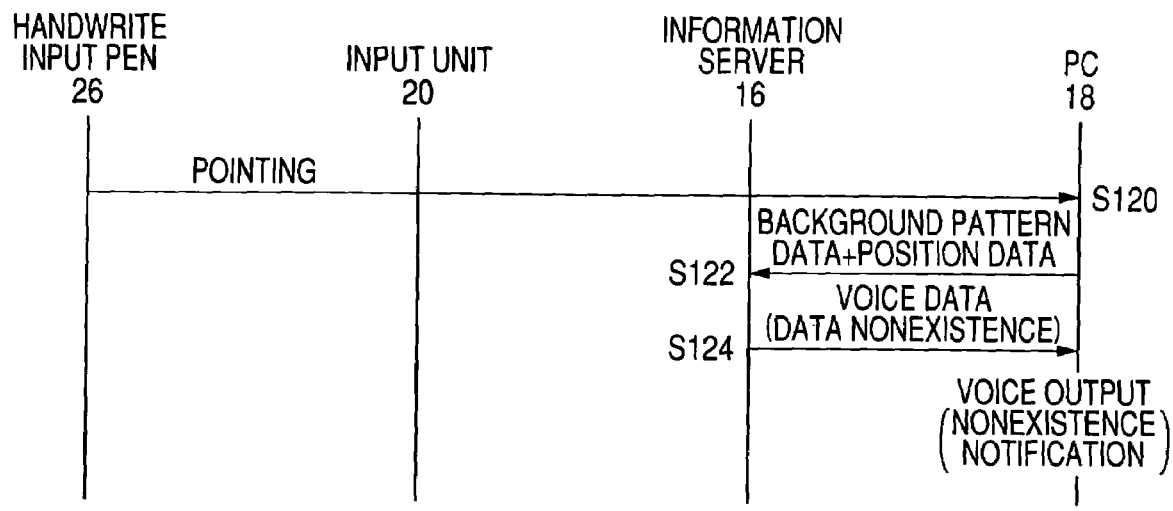
FIG. 16 is a chart to show a communication sequence S12 to implement the education service shown in FIG. 14 in the information management system 1 of FIG. 1.

FIG. 16 is a chart to show a communication sequence (S12) to implement the education service shown in FIG. 14 in the information management system 1 (FIG. 1).

As shown in FIG. 16, at step 120 (S120), the user points to any desired position on the paper 128, 130 with a background using the handwrite input pen 26 near the PC 18 (FIG. 1, FIG. 2, FIG. 10).

The PC 18 detects the background pattern data of the paper 128, 130 and the position on the paper 128, 130 pointed to by the user.

At step 122 (S122), the PC 18 transmits the detected background pattern data of the paper 128, 130 and the position data indicating the position pointed to by the user to the information server 16.

At step 124 (S124), the information server 16 transmits the voice data corresponding to the background pattern data and the position data from the PC 18 (or data indicating that no voice data exists) to the PC 18.

The PC 18 outputs the voice data from the information server 16 (or data indicating that no voice data exists) in voice, etc.

Third Embodiment

[User Authentication using Handwrite Input Pen]

Figure 17:
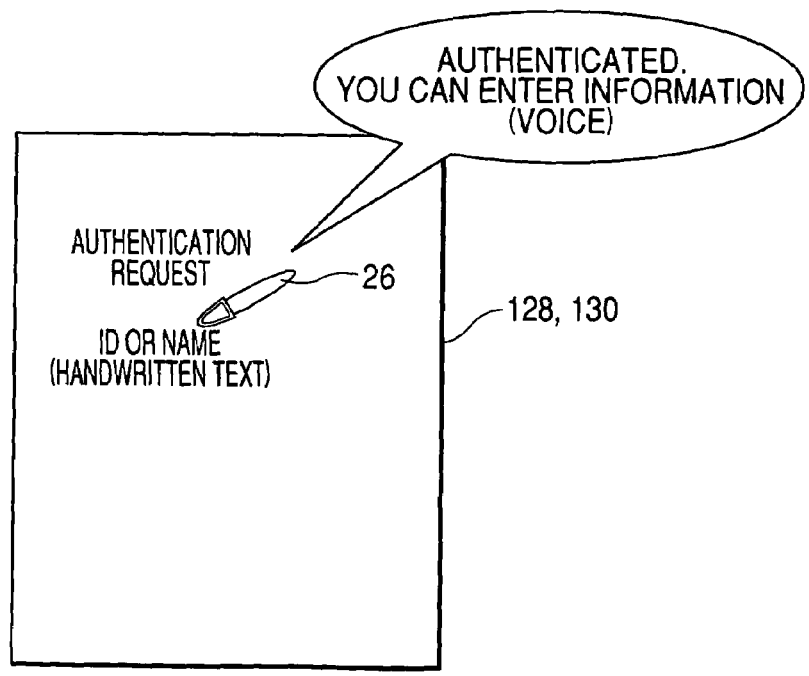
FIG. 17 is a drawing to illustrate user authentication using the handwrite input pen shown in FIG. 1, FIG. 4.

FIG. 17 is a drawing to illustrate user authentication using the handwrite input pen 26 (FIG. 1, FIG. 4).

As shown in FIG. 17, to conduct user authentication using the handwrite input pen 26, for example, first the user uses the handwrite input pen 26 to write a character string of "authentication request" onto the paper 128, 130 with a background in longhand and subsequently writes the identifier given to the user (user ID) or the user name (user ID or name) in longhand.

Figure 18:
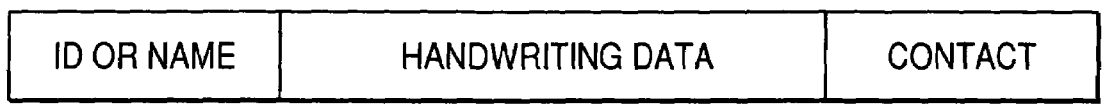
FIG. 18 is a drawing to illustrate user authentication data stored in the added service DB shown in FIG. 9 and used for user authentication using the handwrite input pen.

FIG. 18 is a drawing to illustrate user authentication data stored in the added service DB 172 shown in FIG. 9 and used for user authentication using the handwrite input pen 26.

When the input unit 20 recognizes the first entered character string "authentication request," subsequently the input unit 20 recognizes the handwritten user ID or user name and transmits the recognized user ID or name and the handwriting data and tool force data indicating the handwriting of the handwritten user ID or name (may transmit either of the handwriting data and tool force data; hereinafter as the handwriting data, tool force data) to the information server 16.

The handwriting data, tool force data indicating the handwriting of the user ID or name by the user, the user ID or name, and information indicating the contact (for example, PC 18), such as the mail address are previously stored in the added service DB 172 of the information server program 160 operating in the information server 16 in association with each other, as shown in FIG. 18.

The information server 16 makes a comparison between the handwriting data, tool force data sent from the input unit 20 and the handwriting data, tool force data associated with the user ID or name sent from the input unit 20. When it is recognized that they are the handwriting of one and the same person, the information server 16 authenticates identification of the user writing the handwritten text and permits the user to enter information.

The information server 16 further sends a notification that an authentication request is made and the result to the contact address registered as the contact of the user using the handwrite input pen 26.

Figure 19:
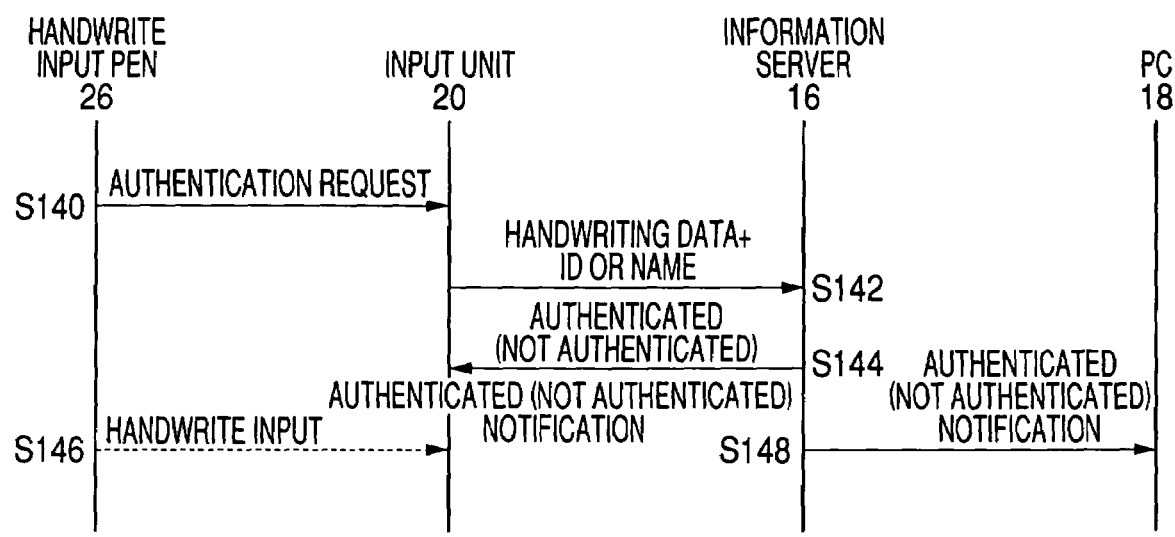
FIG. 19 is a chart to show a communication sequence S14 to implement the user authentication using the handwrite input pen shown in FIG. 17 in the information management system.

FIG. 19 is a chart to show a communication sequence (S14) to implement the user authentication using the handwrite input pen 26 shown in FIG. 17 in the information management system 1.

As shown in FIG. 19, when the user uses the handwrite input pen 26 to write a character string of "authentication request" onto the paper 128, 130 with a background in longhand and subsequently writes the user ID or name in longhand at step 140 (S140), the handwrite input pen 26 outputs the handwriting data, tool force data indicating the character string to the input unit 20.

At step 142 (S142), the input unit 20 recognizes "authentication request" and the user ID or name handwritten by the user and transmits the recognized user ID or name and the handwriting data, tool force data indicating the handwriting of the user ID or name to the information server 16.

At step 144 (S144), the information server 16 makes a comparison between the handwriting data, tool force data sent from the input unit 20 and the handwriting data, tool force data (FIG. 18) associated with the recognized user ID or name in the added service DB 172 (FIG. 9).

When they are in the same range, the information server 16 authenticates the user using the handwrite input pen 26 and informs the input unit 20 that the user is permitted to enter information.

On the other hand, when they are not in the same range, the information server 16 does not authenticate the user using the handwrite input pen 26 and informs the input unit 20 that the user is not permitted to enter information.

At step 146 (S146), upon reception of the notification that the user is authenticated from the information server 16, the input unit 20 accepts information from the handwrite input pen 26.

At this time, the input unit 20 may send a notification of the authentication result to the user of the handwrite input pen 26 in voice as illustrated in FIG. 17.

At step 148 (S148), the information server 16 sends a notification that an authentication request is made and the result to the PC 18.

Here, the user authentication based on the handwriting has been shown. However, it is also possible to conduct user authentication to which the gripping strength of the user is added, for example, as a pressure sensor is provided in the grip part of the handwrite input pen main body 262 of the handwrite input pen 26.

Alternatively, it is also possible to obtain an image of the fingerprint of the user by the lens system 264 and the CCD 266 of the handwrite input pen 26 (FIG. 4) and use the fingerprint image for authentication, to conduct authentication using the identification number or code unique to each handwrite input pen 26, or to conduct authentication using voice of the user provided by the MIC 272 of the handwrite input pen 26.

Fourth Embodiment

[User Authentication Using Electronic Authentication Seal]

Figures 20, 21:
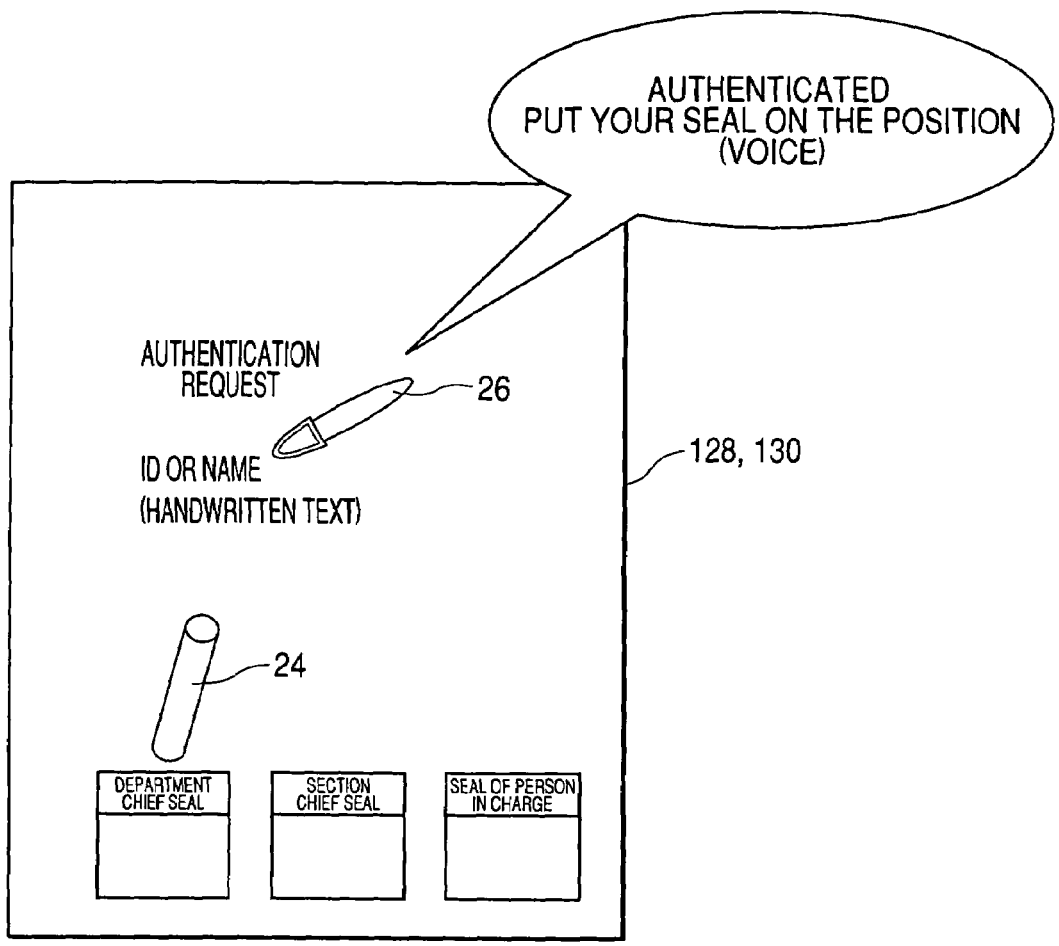
FIG. 20 is a drawing to illustrate user authentication using the electronic authentication seal shown in FIG. 1, FIG. 7.
FIG. 21 is a drawing to show data stored in the added service DB of the information server program of FIG. 9 for the user authentication using the electronic authentication seal shown in FIG. 20.

FIG. 20 is a drawing to illustrate user authentication using the electronic authentication seal 24 (FIG. 1, FIG. 7).

As shown in FIG. 20, to use user authentication using the electronic authentication seal 24 in the information management system 1 (FIG. 1), for example, first the user enters information that can be used for the user authentication, such as his or her fingerprint image or his or her voice, in the electronic authentication seal 24.

In addition to them, the strength of abutting the electronic authentication seal 24 against the paper 128, 130, the gripping strength that can be detected by a pressure sensor on the side of the electronic authentication seal main body 242 of the electronic authentication seal 24 (FIG. 7), and the like can be included, for example, as the information that can be used for the user authentication.

The electronic authentication seal 24 sends the input authentication data through the input unit 20 to the information server 16, which then uses the authentication data to authenticate the user.

Further, the information server 16 obtains the background pattern 136 (FIG. 3) from the image of the paper 128, 130 against which the electronic authentication seal 24 is abutted, identifies the paper 128, 130 on which seal is to be put, and further detect the position on which the user is to put his or her seal.

The information server 16 specifies whether or not the electronic authentication seal 24 is abutted against the correct position of the correct paper 128, 130 (department chief seal in FIG. 20) and is used to put seal by the valid user based on the obtained background pattern 136 and the position against which the electronic authentication seal 24 is abutted as the result of the authentication, and transmits the determination result to the input unit 20 and also sends the determination result to the contact of the user.

The input unit 20 shows the determination result for the user in voice ("AUTHENTICATED. PUT YOUR SEAL ON THE POSITION" in FIG. 20) or as an image, etc. The information server 16 accepts seal impression data from the electronic authentication seal 24 abutted against the correct position of the correct paper 128, 130 by the valid user.

As shown in FIG. 20, the user authentication using the electronic authentication seal 24 and the user authentication using the handwrite input pen 26 shown in FIG. 17 can be used in combination.

FIG. 21 is a drawing to show data stored in the added service DB 172 of the information server program 160 (FIG. 9) for the user authentication using the electronic authentication seal 24 shown in FIG. 20.

As shown in FIG. 21, the user ID or name, the authentication data used for the user authentication, such as user's fingerprint, voiceprint, and sealing, gripping strength, the background pattern data to identify the correct paper 128, 130, the position data to identify the correct sealing position, and the contact such as the mail address of the user of the electronic authentication seal 24 are stored in the added service DB 172 for the user authentication using the electronic authentication seal 24.

Further, when seal impression information data is accepted from the electronic authentication seal 24, the accepted seal impression information data is stored in the added service DB 172 in association with the above-mentioned data.

Figure 22:
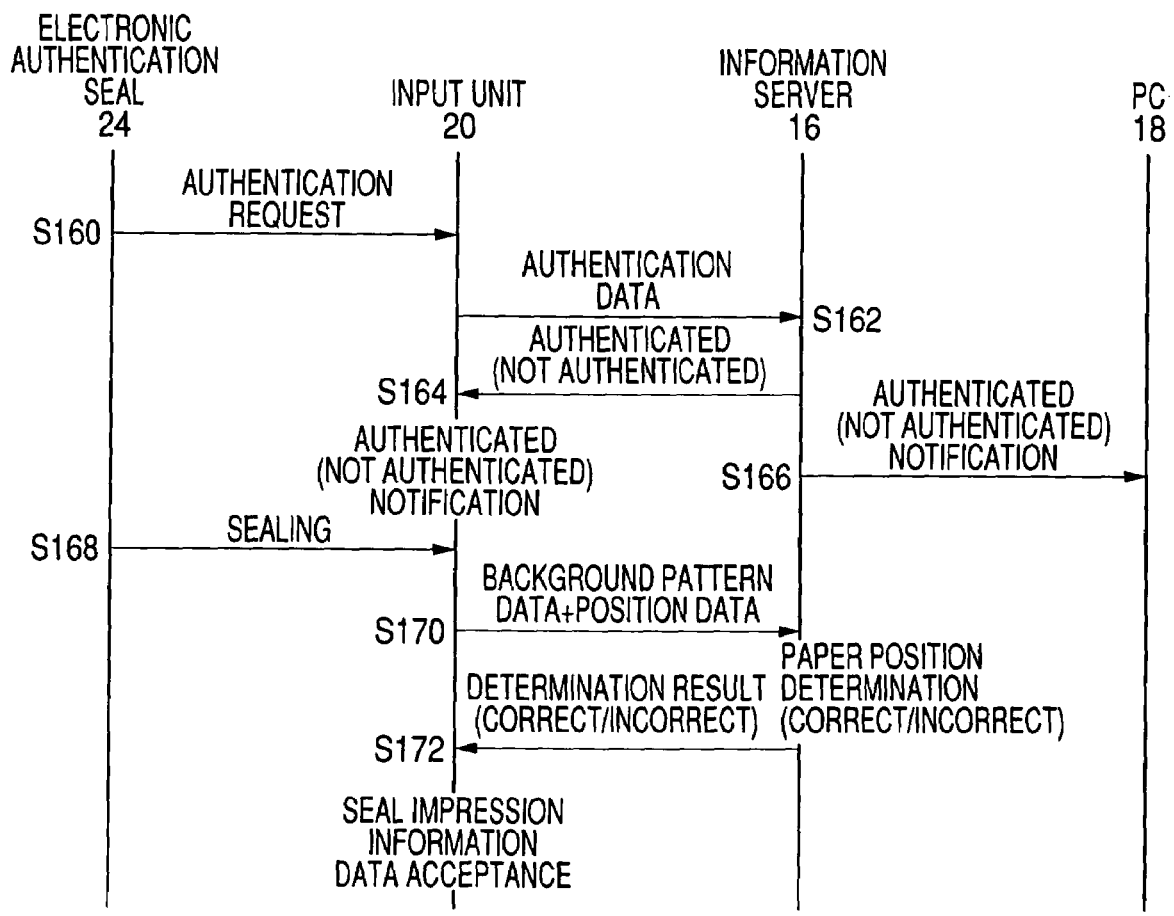
FIG. 22 is a chart to show a communication sequence S16 to implement the user authentication using the electronic authentication seal shown in FIG. 20.

FIG. 22 is a chart to show a communication sequence (S16) to implement the user authentication using the electronic authentication seal 24 shown in FIG. 20.

As shown in FIG. 22, at step 160 (S160), the user of the electronic authentication seal 24 uses the handwrite input pen 26 or performs predetermined operation (enters voice, points to the paper 128, 130 with a background, or the like) for the electronic authentication seal 24 and further enters information required for authentication, such as fingerprint image, in the electronic authentication seal 24 to make an authentication request.

At step 162 (S162), the input unit 20 accepts the authentication request and transmits the authentication data to the information server 16.

At step 164 (S164), the information server 16 makes a comparison between the authentication data from the input unit 20 and the previously stored authentication data (FIG. 21). When they are in the same range, the information server 16 authenticates identification of the user of the electronic authentication seal 24; otherwise, the information server 16 does not authenticate identification of the user of the electronic authentication seal 24.

At step 164 (S164), the information server 16 returns the authentication result to the input unit 20.

The input unit 20 shows the authentication result for the user in voice, etc.

At step 166 (S166), the information server 16 sends a notification that the authentication request is made and the result to the contact of the user of the electronic authentication seal 24 (for example, the PC 18 (FIG. 1)).

At step 168 (S168), when the authenticated user abuts the electronic authentication seal 24 against the predetermined position of the paper 128, 130 with the background (the field of the department chief seal in FIG. 20) and puts the seal on the field, the electronic authentication seal 24 transmits the seal impression information data, the background pattern data, and the position data indicating the position on which the seal is put to the input unit 20.

At step 170 (S170), the input unit 20 transmits the background pattern data and the position data to the information server 16.

The information server 16 makes a comparison between the background pattern data and the position data from the input unit 20 and the previously stored background pattern data and position data, and specifies whether or not the electronic authentication seal 24 is abutted against the correct position of the correct paper 128, 130.

At step 172 (S172), the information server 16 sends the determination result at S170 to the input unit 20.

When the determination result from the information server 16 indicates that the electronic authentication seal 24 is abutted against the correct position of the correct paper 128, 130, the input unit 20 accepts the seal impression information data received from the electronic authentication seal 24 and transmits the seal impression information data to any other node as required.

As the image of the paper 128, 130 with the background provided by the electronic authentication seal 24 is processed, the angle of the seal print of the electronic authentication seal 24 can be detected and therefore user authentication based on the angle of the seal print of the electronic authentication seal 24 may be conducted.

Since an image of the user's fingerprint can be provided by the electronic authentication seal 24, user authentication based on the fingerprint may be conducted.

Since the grasping power of the user gripping the electronic authentication seal 24 can be detected, user authentication based on the grasping power may be conducted.

Fifth Example

[Selective Addition of Background Pattern, etc.]

Figure 23:
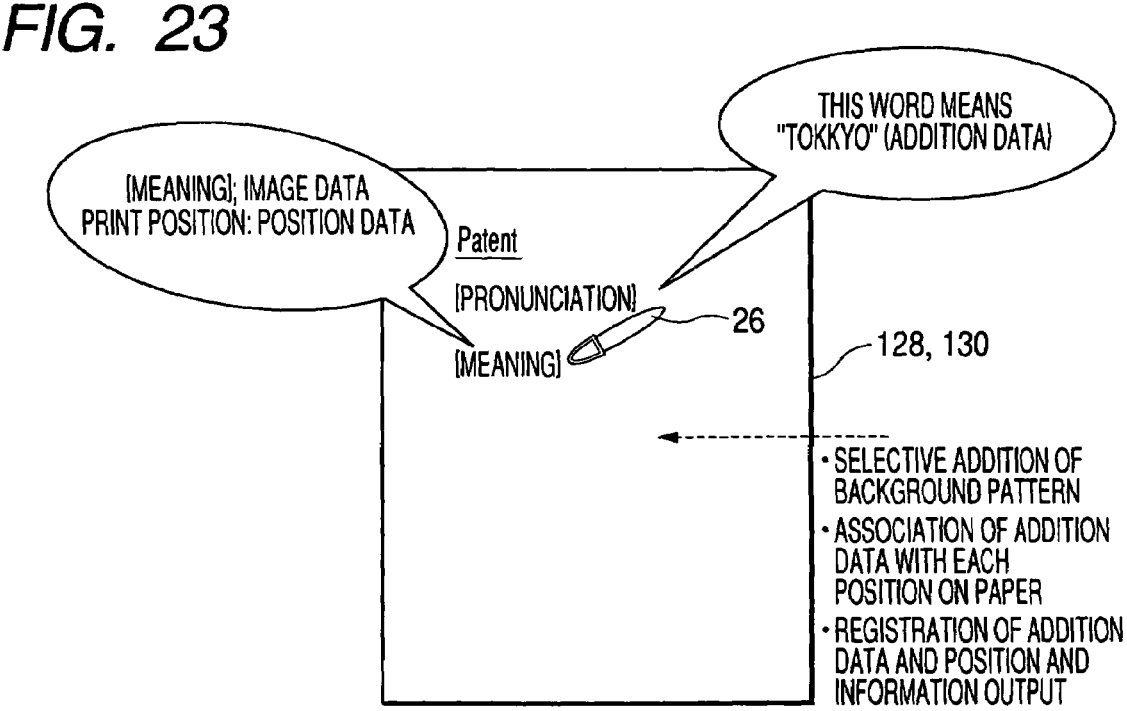
FIG. 23 is a drawing to illustrate selective addition of the background pattern shown in FIG. 3 to paper in the information management system and management and output of addition data using the background pattern.

FIG. 23 is a drawing to illustrate selective addition of the background pattern 136 (FIG. 3) to the plain paper 128, 130 in the information management system 1 (FIG. 1) and management and output of addition data using the background pattern 136.

As selective addition of the background pattern 136 and management and output of addition data using the background pattern 136, which will be hereinafter referred to simply as "selective addition of the background pattern 136" or the like, described below, the background pattern 136 is selectively added to the plain paper 128, 130 in the information management system 1 (FIG. 1) as required and the paper 128 with the background pattern 136 can be used to manage and output data as with the education service previously described with reference to FIG. 14.

As shown in FIG. 23, the selective addition of the background pattern 136 in the information management system 1 is realized as follows:

First, the application 186 of the information use program 180 (FIG. 10) operating in the PC 18 in the information management system 1 (FIG. 1) creates the image data to print on the plain paper 128, 130 ("Patent," "[PRONUNCIATION]," "[MEANING]"), the position data indicating the position of the image data on the paper 128, 130, and addition data added to the image on the paper 128 and output when the user points to the image (for example, the image of "[PRONUNCIATION]" and the voice data of "patent" associated with the position or the image of "[MEANING]" and the text data of "tokkyo" associated with the position) Next, to input/output information as previously described with reference to FIG. 14 using the paper 128, 130, the application 186 (FIG. 10) requests the background management unit 32 (FIG. 1, FIG. 11) to send the background pattern 136 to be put on the plain paper 128, 130, and receives the background pattern 136 sent from the background management unit 32 in response to the request.

Next, the application 186 outputs the created image data and the background pattern 136 received from the background management unit 32 to the authorized printer 122 and causes the authorized printer 122 to print the image data and the background pattern 136 on the plain paper 128, 130.

Figure 24A:
FIGS. 24A and 24B are drawings to illustrate data stored in the added service DB of FIG. 9 of the information server to implement the selective addition of the background pattern, etc., shown in FIG. 23.
Figure 24B:
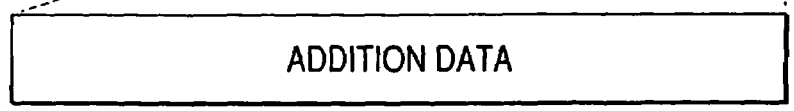

FIGS. 24A and 24B are drawings to illustrate data stored in the added service DB 172 (FIG. 9) of the information server 16 to implement the selective addition of the background pattern 136, etc., previously described with reference to FIG. 23; FIG. 24A shows an index used to output addition data and FIG. 24B shows addition data referenced by the index.

Next, the application 186 transmits the background pattern data indicating the background pattern 136 printed on the paper 128, 130 together with the image, the position data indicating the position of the image on the paper 128, 130 with which the addition data is associated, and the addition data associated with the image on the paper 128, 130 to the information server 16 for registration therein.

Consequently, the background pattern ID to identify the background pattern 136 put on the paper 128, 130, the position data indicating the position of each image, and the addition data ID indicating the addition data associated with the position are stored as index in association with each other in the added service DB 172 of the information server program 160 (FIG. 9) operating in the information server 16, as shown in FIG. 24A.

Further, the addition data corresponding to the addition data ID shown in FIG. 24A is stored in the added service DB 172 as shown in FIG. 24B.

After this registration, the user points to any image (FIG. 23) on the paper 128, 130 with the image and the background pattern 136 using the handwrite input pen 26, for example, in the proximity of the PC 18 (FIG. 1).

As the user points to the image, the addition data associated with the image pointed to by the user is sent from the information server 16 to the PC 18, which then displays and outputs the addition data for the user.

Figure 25:
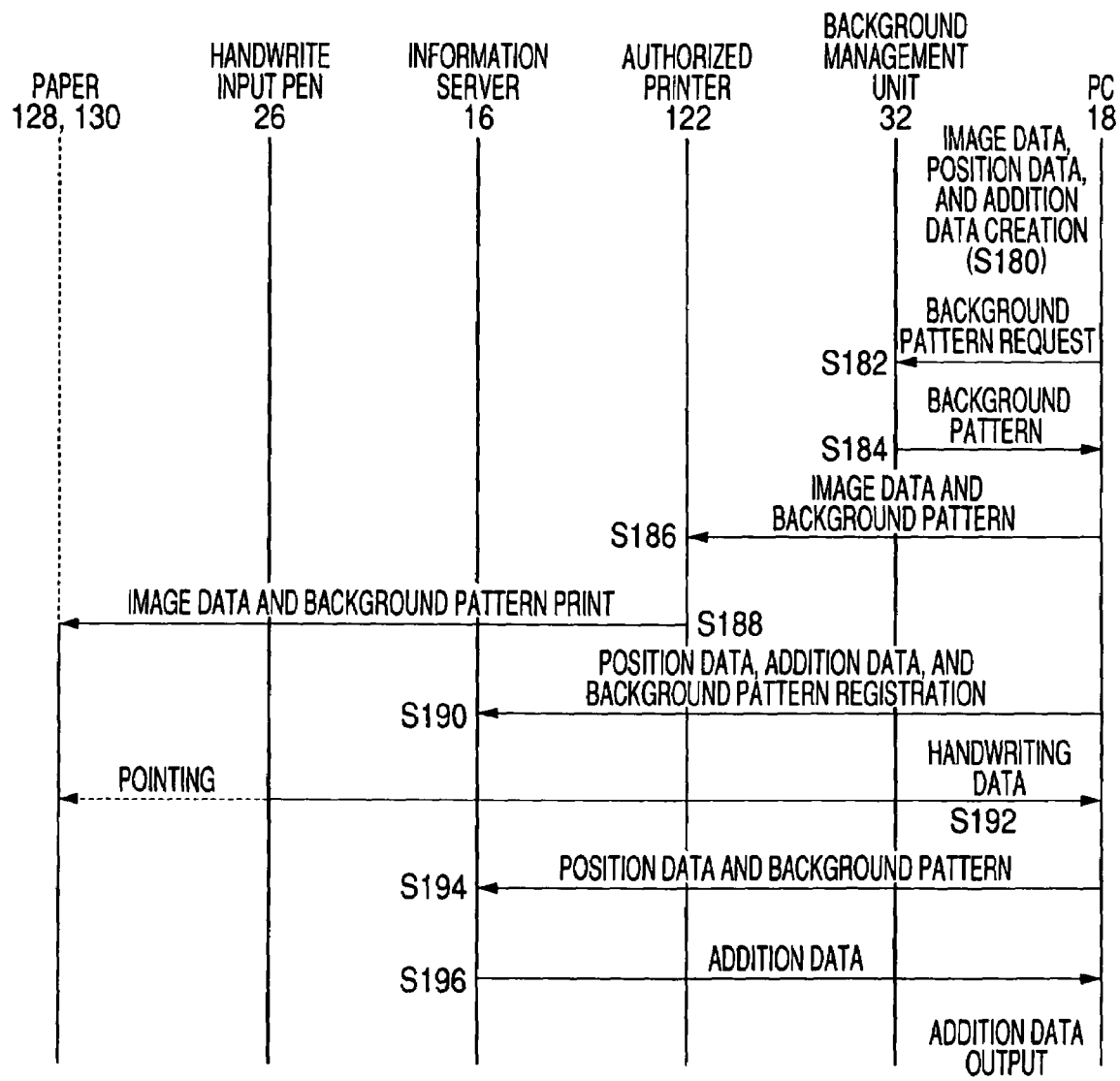
FIG. 25 is a chart to show a communication sequence (S18) to implement the selective addition of the background pattern shown in FIG. 23.

FIG. 25 is a chart to show a communication sequence (S18) to implement the selective addition of the background pattern 136 shown in FIG. 23.

As shown in FIG. 25, at step 180 (S180), image data, position data, addition data, and the like are created in the PC 18 in response to operation of the user.

At step 182 (S182), the PC 18 requests the background management unit 32 (FIG. 1, etc.,) to send the background pattern 136 in response to operation of the user.

At step 184 (S184), the background management unit 32 selects an unused background pattern 136 not printed on any paper 128, 130 so far, and transmits the selected background pattern 136 to the PC 18.

At step 186 (S186), the PC 18 transmits the background pattern 136 received from the background management unit 32 and the image data to the authorized printer 122 (FIG. 1).

At step 188 (S188), the authorized printer 122 prints the image data and the background pattern 136 from the PC 18 on the plain paper 128, 130.

At step 190 (S190), the PC 18 registers the position data, the addition data, and the background pattern in the information server 16 (FIG. 1) as shown in FIG. 24.

At step 192 (S192), when the user points to the image printed on the paper 128, 130 using the handwrite input pen 26 near the PC 18, the handwriting data indicating the background pattern 136 put on the paper 128, 130 pointed to by the user and the pointing position is transmitted to the PC 18.

At step 194 (S194), the PC 18 creates the background pattern data indicating the background pattern 136 put on the paper 128, 130 and the position data indicting the position on the paper 128, 130 pointed to by the user from the handwriting data from the handwrite input pen 26, and transmits the background pattern data and the position data to the information server 16.

At step 196 (S196), the information server 16 returns the addition data corresponding to the background pattern data and the position data from the PC 18 to the PC 18.

Upon reception of the addition data from the information server 16, the PC 18 displays and outputs the addition data for the user in voice or as an image.

Sixth Embodiment

[Reuse of Background Pattern]

Figure 26:
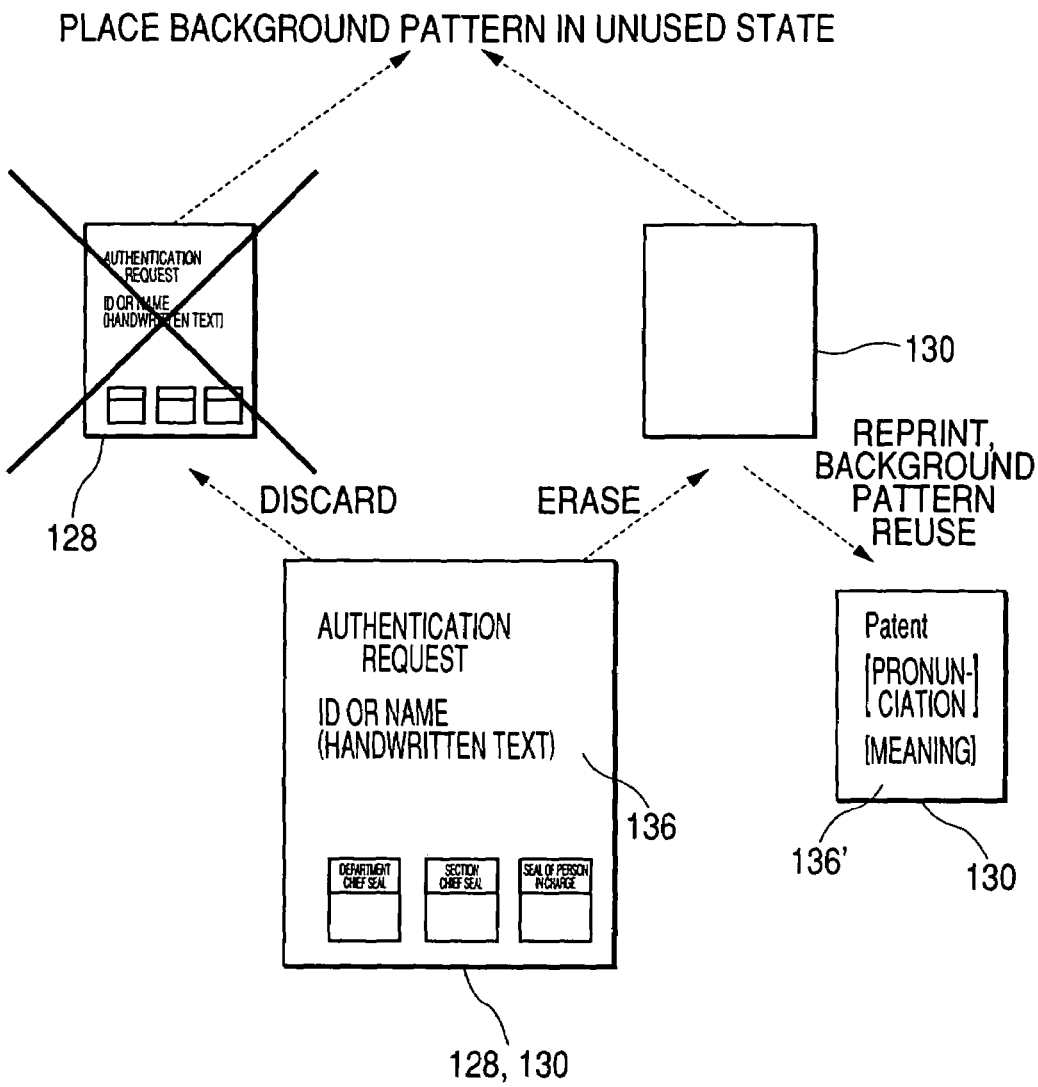
FIG. 26 is a drawing to illustrate reuse of the background pattern in the information management system 1 shown in FIG. 1.

FIG. 26 is a drawing to illustrate reuse of the background pattern 136 in the information management system 1 (FIG. 1).

An enormous number of types of background patterns 136 (FIG. 3) are available and a unique background pattern 136 can be virtually used for each of the paper 128, 130.

In fact, however, a finite number of types of background patterns 136 are available and therefore it is desirable that it should be made possible to reuse the background pattern 136.

That is, as shown in FIG. 26, when the paper 128 from which the printed image cannot be erased or the paper 130 from which the printed image can be erased is discarded or when the background pattern 136 is erased from the paper 130, it is desirable that the background pattern 136 put on the paper 128, 130 should be restored from the already used state to an unused state for management so that it is made possible to newly print the background pattern 136 on plain paper 128, 130.

Figure 27:
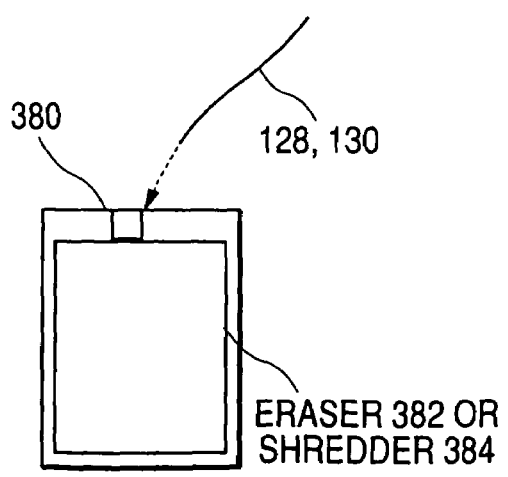
FIG. 27 is a drawing to illustrate a function implementation unit used to reuse a background pattern.

FIG. 27 is a drawing to illustrate the function implementation unit 38 used to reuse the background pattern 136.

To reuse the background pattern 136, it is desirable that an eraser 382 for erasing the image of the background pattern 136, etc., printed on the paper 130 or a shredder 384 for discarding the paper 128, 130 with the background and a scanner 380 for reading the background pattern 136 put on the paper 128, 130 should be used in combination as the function implementation unit 38 of the PC 18 (FIG. 1, FIG. 2), for example, as shown in FIG. 27.

To erase the image of the background pattern 136, etc., printed on the paper 130 in the function implementation unit 38 shown in FIG. 27, the scanner 380 reads the background pattern 136 put on the paper 130 and then the eraser 382 erases the image and the background pattern 136 printed on the paper 130.

On the other hand, to discard the paper 128, 130 with the background in the function implementation unit 38, the scanner 380 reads the background pattern 136 printed on the paper 128, 130 and then the shredder 384 shreds and discards the paper 128, 130.

The background pattern 136 read by the function implementation unit 38 is used by the application 186 of the information use program 180 (FIG. 10) operating in the PC 18 to reuse the background pattern 136.

Figure 28:
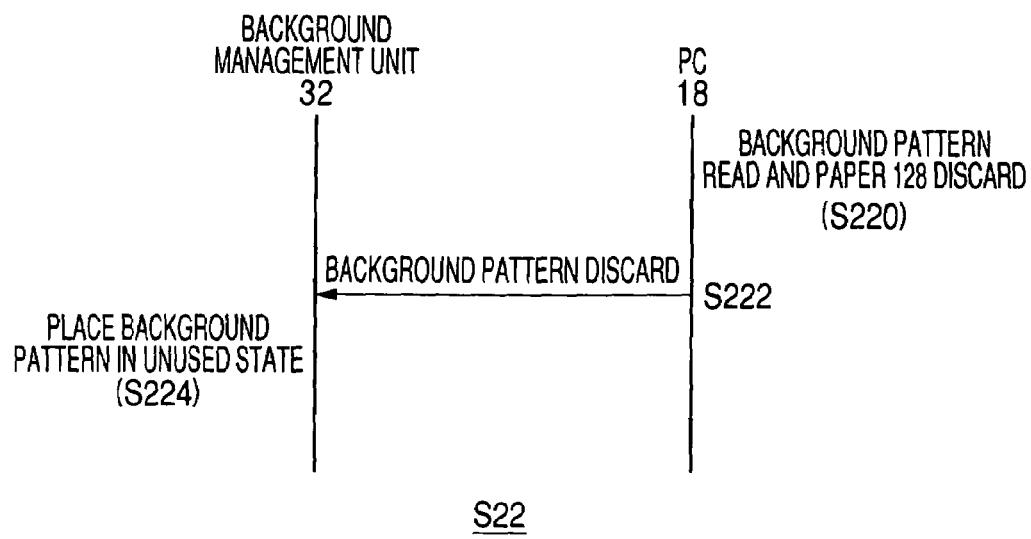
FIG. 28 is a chart to show a communication sequence S22 to place the background pattern shown in FIG. 3 put on paper in an unused state when the paper is discarded in the information management system shown in FIG. 1.

FIG. 28 is a chart to show a communication sequence (S22) to place the background pattern 136 (FIG. 3) put on the paper 128, 130 in an unused state when the paper 128, 130 with a background is discarded in the information management system 1 (FIG. 1).

As shown in FIG. 28, at step 220 (S220), when the user inserts already used paper 128, 130 into the function implementation unit 38 (shredder 384 in FIG. 27) of the PC 18 (FIG. 1), the scanner 380 reads the background pattern 136 put on the paper 128, 130 and outputs the background pattern 136 to the information use program 180 (FIG. 10).

The shredder 384 shreds and discards the paper 128, 130 inserted into the function implementation unit 38.

At step 222 (S222), the PC 18 transmits the background pattern 136 put on the discarded paper 128, 130 to the background management unit 32 (FIG. 1) and further notifies the background management unit 32 that the paper is discarded.

At step 224 (S224), the background management unit 32 places the background pattern 136 sent from the PC 18 in an unused state and manages the background pattern 136 so that the background pattern 136 can be reused.

Figure 29:
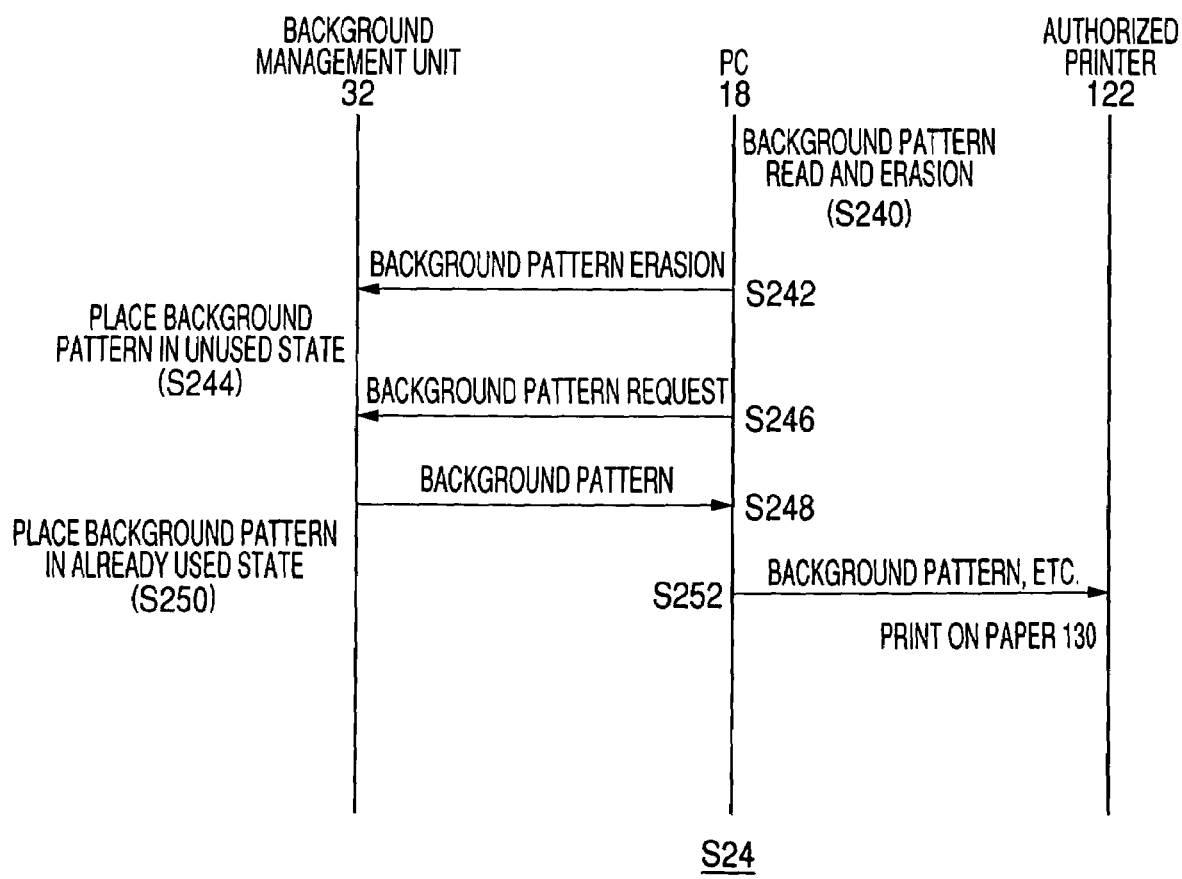
FIG. 29 is a chart to show a communication sequence S24 to place the background pattern shown in FIG. 3 put on paper in an unused state to reuse the background pattern when the image and the background pattern put on the reusable paper are erased in the information management system shown in FIG. 1.

FIG. 29 is a chart to show a communication sequence (S24) to place the background pattern 136 (FIG. 3) put on the paper 130 in an unused state to reuse the background pattern 136 when the image and the background pattern 136 put on the reusable paper 130 are erased in the information management system 1 (FIG. 1).

As shown in FIG. 29, at step 240 (S240), when the user inserts already used paper 130 into the function implementation unit 38 (eraser 382 in FIG. 27) of the PC 18 (FIG. 1), the scanner 380 reads the background pattern 136 put on the paper 130 and outputs the background pattern 136 to the information use program 180 (FIG. 10).

The eraser 382 erases the image and the background pattern 136 put on the paper 130 inserted into the function implementation unit 38 to place in a reusable state.

At step 242 (S242), the PC 18 transmits the background pattern 136 put on the paper 130 with the image, etc., erased to the background management unit 32 (FIG. 1) and further notifies the background management unit 32 that the background pattern 136 is erased.

At step 244 (S244), the background management unit 32 places the background pattern 136 sent from the PC 18 in an unused state and manages the background pattern 136 so that the background pattern 136 can be reused.

At step 246 (S246), the PC 18 requests the background management unit 32 to send a background pattern 136.

At step 248 (S248), the background management unit 32 transmits a background pattern 136 in an unused state (regardless of whether or not it is the background pattern 136 erased at S240) to the requesting PC 18.

At step 250 (S250), the background management unit 32 places the background pattern 136 transmitted to the PC 18 in an already used state for management.

At step 252. (S252), the PC 18 transmits the background pattern 136 to the authorized printer 122 (FIG. 1) and causes the authorized printer 122 to print the background pattern 136 on the paper 130.

The invention can be used to manage and output information.

What is claimed is:

1. A data management system for managing a plurality of pieces of mark data, each piece of mark data associated with a plurality of unique marks to be put on a surface of an object, the data management system comprising:

a management unit that manages the plurality of pieces of mark data;

a first data storage unit that stores unused pieces of mark data and, if an unused plurality of unique marks is put on the surface of the object, the management unit removes the associated unused piece of mark data from the first data storage unit;

a second data storage unit that stores used pieces of mark data and, if a used plurality of unique marks is no longer used, the management unit removes the associated piece of mark data from the second data storage unit and stores the associated piece of mark data in the first storage unit; and a data distribution unit that distributes an unused piece of mark data if a request for mark data is received, wherein the plurality of unique marks comprises a pattern that indicates a physical position on the surface of the object of an item on the surface of the object.

2. The data management system according to claim 1, wherein:

the object includes a printing medium, which is one of a paper and a sheet-like medium; and the mark is to be printed on the printing medium.

3. The data management system according to claim 2, wherein:

the printing medium includes at least one of a first print medium from which the printed mark cannot be erased and a second print medium from which the printed mark can be erased:

if the unused mark is printed on the printing medium, the first data management unit manages a piece of mark data indicating that the used mark is in use; and if the printing medium becomes unused or if the mark printed on the second print medium is erased, the second data management unit manages a piece of mark data indicating that the mark printed on the first or second print medium is unused.

4. A data management method for managing a plurality of pieces of mark data, each piece of mark data associated with a plurality of unique marks to be put on a surface of an object, the data management method comprising:

storing an unused piece of mark data and, if an unused plurality of unique marks is put on the surface of the object, storing the associated unused piece of mark data as used mark data; storing a used piece of mark data and, if a used plurality of unique marks is no longer used, storing the associated used piece of mark data as unused mark data; and distributing an unused piece of mark data if a request for mark data is received, wherein the plurality of unique marks comprises a pattern that indicates a physical position on the surface of the object of an item on the surface of the object.

5. A computer-readable medium having a computer-executable program recorded therein that causes a computer to execute a method of managing a plurality of pieces of mark data, each piece of mark data associated with a plurality of unique marks to be put on a surface of an object, the method comprising:
- a first data management function that, if an unused plurality of unique marks is put on the surface of the object, stores the associated unused piece of mark as used mark data;
- a second data management function that, if the a used piece of mark data is no longer used, stores the associated used piece of mark data as unused mark data; and
- a data distribution function that, if a request for mark data is received, distributes an unused pieces of mark data in response to the request,
- wherein the plurality of unique marks comprises a pattern that indicates a physical position on the surface of the object of an item on the surface of the object.

6. The computer-readable medium according to claim 5, wherein: the object includes a printing medium, which is one of a paper and a sheet-like medium;
and the mark is to be printed on the printing medium.

7. The computer-readable medium according to claim 6, wherein:
- the printing medium includes at least one of a first print medium from which the printed mark cannot be erased and a second print medium from which the printed mark can be erased:
- if the unused mark is printed on the printing medium, the first data management function manages a piece of mark data indicating that the used mark is in use; and
- if the printing medium becomes unused or if the mark printed on the second print medium is erased, the second data management function manages a piece of mark data indicating that the mark printed on the first or second print medium is unused.

8. A data management system for managing a plurality of pieces of mark data, each piece of mark data associated with a plurality of unique marks to be put on a surface of an object, comprising:
- a control unit that communicates with an external device; and
- a first database that stores an unused piece of mark data,
- wherein if the control unit receives a request for mark data from the external device, the control unit transmits an unused piece of mark data to the external device and a second database stores the transmitted piece of mark data as a used piece of mark data,
- wherein the plurality of unique marks comprises a pattern that indicates a physical position on the surface of the object of an item on the surface of the object.

9. The data management system according to claim 8, further comprising:
- a second database that stores a plurality of unused pieces of mark data,
- wherein if the control unit receives the request signal from the external device, the control unit acquires and transmits one of the pieces of mark data from the second database to the external device.

10. The data management system according to claim 9, wherein if the control unit transmits the unused piece of mark data to the external device, the control unit deletes the transmitted piece of mark data from the second database.

11. The data management system according to claim 8, wherein:
- if the control unit receives a signal indicating that a certain mark becomes unused from the external device, the control unit deletes a piece of mark data corresponding to the certain mark from the first database.

* * * * *